(12) United States Patent
Stimpson et al.

(10) Patent No.: US 12,510,013 B2
(45) Date of Patent: Dec. 30, 2025

(54) AIR/EXHAUST SYSTEM FOR A VEHICLE

(71) Applicant: Polaris Industries Inc., Medina, MN (US)

(72) Inventors: Matthew Stimpson, Nowthen, MN (US); Bret RempelEwert, Shafer, MN (US); Benjamin W. Moscherosch, Stacy, MN (US); James AJ Holroyd, Stillwater, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/603,542

(22) Filed: Mar. 13, 2024

(65) Prior Publication Data

US 2024/0309795 A1    Sep. 19, 2024

Related U.S. Application Data

(60) Provisional application No. 63/452,740, filed on Mar. 17, 2023.

(51) Int. Cl.
| F01N 13/18 | (2010.01) |
| F01N 3/28 | (2006.01) |
| F01N 13/00 | (2010.01) |
| F01N 13/10 | (2010.01) |
| F02B 77/13 | (2006.01) |

(Continued)

(52) U.S. Cl.
CPC ....... *F01N 13/1805* (2013.01); *F01N 3/2803* (2013.01); *F01N 13/008* (2013.01); *F01N 13/10* (2013.01); *F02B 77/13* (2013.01); *F02M 35/10137* (2013.01); *F02M 35/10144* (2013.01);

(Continued)

(58) Field of Classification Search
CPC ...... F01N 13/008; F01N 13/082; F01N 13/10; F01N 13/1805; F01N 3/2803
See application file for complete search history.

(56) References Cited

U.S. PATENT DOCUMENTS 4,118,199 A * 10/1978 Volker .................... B01J 35/19
422/171
5,833,932 A * 11/1998 Schmelz ............... F01N 3/2066
422/171

(Continued)

FOREIGN PATENT DOCUMENTS

DE    102011014908 A1    11/2011
EP    0848144 A1    6/1998

*Primary Examiner* — Anthony Ayala Delgado
(74) *Attorney, Agent, or Firm* — SCHWEGMAN LUNDBERG & WOESSNER, P.A.

(57) ABSTRACT

The disclosure provides an air/exhaust system for a vehicle, including a vented exhaust outlet with an inner tube and an outer tube having vents that draw air into a gap between the tubes to mix with exhaust from the inner tube and discharge cooled exhaust, an exhaust shield for reducing the noise emanating from the exhaust pipe, an exhaust collector with an inlet body, a neck body that causes the flow of the exhaust to converge and an expansion cone defining an expansion angle that improves distribution of exhaust flow across a catalytic converter. The catalytic converter has an inlet matrix brick formed from a foil that is thicker than a foil used to form an outlet matrix brick to improve the durability and performance. Finally, the system includes an intake duct with an interface having fingers that contact a frame member to inhibit wear of the intake duct.

15 Claims, 23 Drawing Sheets

(51) Int. Cl.
*F02M 35/10* (2006.01)
*F02M 35/104* (2006.01)

(52) U.S. Cl.
CPC .. *F02M 35/10321* (2013.01); *F02M 35/1034* (2013.01); *F02M 35/104* (2013.01)

(56) References Cited

U.S. PATENT DOCUMENTS

| | | | |
|---|---|---|---|
| 6,595,318 | B2 | 7/2003 | Ebinger et al. |
| 7,052,532 | B1 * | 5/2006 | Liu .................... B01D 46/0001 55/DIG. 5 |
| 7,845,452 | B2 | 12/2010 | Bennett et al. |
| 7,854,290 | B1 | 12/2010 | McKoskey |
| 7,874,150 | B2 | 1/2011 | Stadler et al. |
| 7,913,489 | B2 | 3/2011 | Angoshtari et al. |
| 7,950,486 | B2 | 5/2011 | Van et al. |
| 8,029,021 | B2 | 10/2011 | Leonard et al. |
| 8,075,007 | B2 | 12/2011 | Brady et al. |
| 8,079,602 | B2 | 12/2011 | Kinsman et al. |
| 8,091,657 | B2 | 1/2012 | Dieter et al. |
| 8,146,932 | B2 | 4/2012 | Brady et al. |
| 8,157,044 | B2 | 4/2012 | Bennett et al. |
| 8,302,711 | B2 | 11/2012 | Kinsman et al. |
| 8,613,337 | B2 | 12/2013 | Kinsman et al. |
| 8,661,798 | B2 | 3/2014 | Prather |
| 9,004,510 | B2 | 4/2015 | Leonard et al. |
| 9,010,768 | B2 | 4/2015 | Kinsman et al. |
| 9,587,689 | B2 | 3/2017 | Pongo et al. |
| 9,592,713 | B2 | 3/2017 | Kinsman et al. |
| 9,713,976 | B2 | 7/2017 | Miller et al. |
| 9,725,023 | B2 | 8/2017 | Miller et al. |
| 10,017,090 | B2 | 7/2018 | Franker et al. |
| 10,124,709 | B2 | 11/2018 | Bohnsack et al. |
| 10,183,605 | B2 | 1/2019 | Weber et al. |
| 10,369,861 | B2 | 8/2019 | Deckard et al. |
| 10,384,722 | B2 | 8/2019 | Leonard et al. |
| 10,457,140 | B2 | 10/2019 | Bennett et al. |
| 10,493,846 | B2 | 12/2019 | Bennett et al. |
| 10,569,642 | B2 | 2/2020 | Borud et al. |
| 10,737,547 | B2 | 8/2020 | Deckard et al. |
| 10,960,937 | B2 | 3/2021 | Novotny et al. |
| 10,974,595 | B2 | 4/2021 | Nelson et al. |
| 11,091,003 | B2 | 8/2021 | Deckard et al. |
| 11,149,605 | B2 | 10/2021 | Schleiermacher et al. |
| 11,254,372 | B2 | 2/2022 | Leonard et al. |
| 11,384,697 | B2 | 7/2022 | Buchwitz et al. |
| 11,434,834 | B2 | 9/2022 | Blake et al. |
| 11,623,487 | B2 | 4/2023 | Nelson et al. |
| 11,660,927 | B2 | 5/2023 | Hollman et al. |
| 11,725,573 | B2 | 8/2023 | Bryant et al. |
| 11,725,599 | B2 | 8/2023 | Buchwitz et al. |
| 11,752,860 | B2 | 9/2023 | Fields et al. |
| 11,781,494 | B2 | 10/2023 | Buchwitz et al. |
| 11,788,432 | B2 | 10/2023 | Zimney et al. |
| 11,828,239 | B2 | 11/2023 | Blake et al. |
| 11,993,124 | B2 | 5/2024 | Deckard et al. |
| 12,031,494 | B2 | 7/2024 | Blake et al. |
| 12,071,857 | B2 | 8/2024 | Hedlund et al. |
| 2010/0269493 | A1 | 10/2010 | Tennison |
| 2013/0037158 | A1 | 2/2013 | Gardner |
| 2013/0152559 | A1 | 6/2013 | Pawl |
| 2022/0355659 | A1 | 11/2022 | Purdy et al. |
| 2023/0322076 | A1 | 10/2023 | Frank et al. |
| 2023/0339541 | A1 | 10/2023 | Nysse et al. |
| 2023/0399975 | A1 | 12/2023 | Tittl et al. |

* cited by examiner

AIR/EXHAUST SYSTEM FOR A VEHICLE

CROSS-REFERENCE TO RELATED APPLICATION

The present application claims the benefit of U.S. Provisional Application No. 63/452,740, entitled "AIR/EXHAUST SYSTEM FOR A VEHICLE," filed on Mar. 17, 2023, which is incorporated by reference herein for all purposes in its entirety.

TECHNICAL FIELD

The present disclosure relates to air and exhaust handling systems for vehicles.

BACKGROUND

This section provides background information related to the present disclosure which is not necessarily prior art. Vehicle air and exhaust handling systems on vehicles are subject to a variety of design constraints including size, emissions performance, durability, temperature constraints, and noise constraints. Cost and safety concerns also influence designs of such systems. In addition, certain vehicles subject the systems to harsh environments with substantial vibration, etc. Accordingly, it is desirable to provide an air and exhaust system for a vehicle that addresses these considerations.

SUMMARY

One embodiment of the present disclosure provides a vented exhaust outlet for a vehicle, comprising: an inner tube including a wall having a first end connected to a muffler and a second end defining an exhaust opening for expelling hot exhaust gasses from the muffler; and an outer tube including a wall having a first end attached to the muffler and a second end defining a discharge opening for discharging cooled exhaust gasses from the vented exhaust outlet, the outer tube wall being concentric with the inner tube wall thereby defining a gap between the outer tube wall and the inner tube wall; wherein the outer tube wall further includes a plurality of vents adjacent the first end of the outer tube wall, each of the plurality of vents including a vent opening that draws ambient air into the gap between the outer tube wall and the inner tube wall in response to the hot exhaust gasses being expelled into a volume defined by the outer tube wall; and wherein the ambient air drawn into the gap through the vent openings mixes with the hot exhaust gasses expelled from the exhaust opening to produce the cooled exhaust gasses discharged from the discharge opening. In one aspect of this embodiment, the first end of the outer tube wall is welded to the muffler. In another aspect, the discharge opening lies in a plane that forms an acute angle with a longitudinal axis of the vented exhaust outlet. In a variant of this aspect, the plane of the discharge opening is substantially parallel to a ground surface when the vented exhaust outlet is mounted to the vehicle. In a further variant, a vertical distance between the plane of the discharge opening and a lowermost surface of a lower frame member of the vehicle is approximately 10 mm. In another aspect, the inner tube wall is cylindrical and the outer tube wall is cylindrical. In another aspect, the inner tube wall and the outer tube wall extend outwardly and downwardly relative to the muffler. In another aspect, the exhaust opening lies in a plane that is substantially perpendicular to a longitudinal axis of the vented exhaust opening. In still another aspect, the second end of the inner tube wall is positioned within the volume defined by the outer tube wall. In another aspect, each of the plurality of vents includes a first side edge, a second side edge that is substantially parallel to the first side edge, and a curved outer edge extending between the first side edge and the second side edge.

In another embodiment, the present disclosure provides an exhaust collector, comprising: an inlet body including a plurality of receiver segments, each receiver segment having an inlet opening for coupling to and receiving exhaust from an exhaust tube; a neck body extending from the inlet body, the neck body including a substantially cylindrical wall having an inner diameter and a transition wall extending from the cylindrical wall; and an expansion cone including a conical wall extending from the transition wall of the neck body, the conical wall including an inner surface; wherein the inlet body, the neck body and the expansion cone defining a flow passage through the exhaust collector; and wherein tangent lines on the inner surface of the conical wall define an expansion angle of the expansion cone within the range of 50 degrees to 130 degrees. In one aspect of this embodiment, the plurality of receiver segments form a clover-shape and the inlet openings of the receiver segments lie in substantially the same plane. In another aspect, an inner diameter of the exhaust collector decreases with distance from the plurality of receiver segments to the inner diameter of the cylindrical wall of the neck body and increases with distance from the inner diameter of the cylindrical wall of the neck body to an outer lip of the expansion cone. Another aspect of this embodiment further comprises an opening in the cylindrical wall of the neck body configured to receive an oxygen sensor. In another aspect, the transition wall of the neck body has a constant transition radius between the inner diameter of the cylindrical wall of the neck body to the conical wall of the expansion cone. In another aspect, the expansion cone includes an outer lip having an inner surface configured to mate with an outer surface of a catalytic converter. In still another aspect, the inner diameter of the cylindrical wall of the neck body is within a range of 45 mm to 75 mm.

In another embodiment, the present disclosure provides a catalytic converter, comprising: a mantle tube defining a flow passageway from an inlet end to an outlet end; an inlet matrix brick positioned within the flow passageway and including a matrix body having an inlet end adjacent the inlet end of the mantle tube and an outlet end, the matrix body formed from a first foil having a first thickness; and an outlet matrix brick positioned within the flow passageway and including a matrix body having an inlet end adjacent and spaced apart from the outlet end of the matrix body of the inlet matrix brick and an outlet end adjacent the outlet end of the mantle tube, the matrix body of the outlet matrix brick formed from a second foil having a second thickness; wherein the first thickness is greater than the second thickness. In one aspect of this embodiment, the mantle tube includes a cylindrical wall that defines the flow passageway. In another aspect, the matrix body of the inlet matrix brick is configured as a helical coil of the first foil that substantially fills the flow passageway, and the matrix body of the outlet matrix brick is configured as a helical coil of the second foil that substantially fills the flow passageway. In a variant of this aspect, the first foil includes a first plurality of cells and the second foil includes a second plurality of cells such that the helical coil of the matrix body of the inlet matrix brick includes a first number of cells per square inch and the helical coil of the matrix body of the outlet matrix brick includes a second number of cells per square inch, the second number of cells per square inch being greater than the first number of cells per square inch. In a further variant, the first number of cells per square inch is approximately 300 and the second number of cells per square inch is approximately 600. In another aspect, the first thickness of the first foil is approximately 80 um and the second thickness of the second foil is approximately 50 um.

In yet another embodiment, the present disclosure provides an intake duct for supplying air to an intake manifold of an engine mounted to a frame assembly including a frame member, the intake duct comprising: a flexible body having a first end configured to couple to an outlet of an airbox, a second end configured to couple to an inlet of the intake manifold, an outer wall and a flow passageway extending through the first end, the second end and the outer wall; and an interface extending from the outer wall of the flexible body adjacent a location of the frame member, the interface including a first finger and a second finger connected together by a connecting segment, the first finger, the second finger and the connecting segment together defining a plurality of engagement portions, each engagement portion having a shape that substantially corresponds to a cylindrical shape of the frame member; wherein contact between the interface and the frame member at the engagement portions inhibits wear of the flexible body as a result of movement of the intake duct with movement of the engine relative to the frame member. In one aspect of this embodiment, the first finger includes an outer side wall and an inner side wall connected together by an upper wall. In a variant of this aspect, the second finger includes an outer side wall and an inner side wall connected together by an upper wall. In a further variant, the inner side wall of the first finger is connected to the inner side wall of the second finger by a lower wall of the connecting segment. In still a further variant, the outer side wall of the first finger includes a first relief cut, the inner side wall of the first finger includes a second relief cut, the inner side wall of the second finger includes a third relief cut, and the outer side wall of the second finger includes a fourth relief cut. In yet a further variant, the plurality of engagement portions includes an outer lower engagement portion on the outer side wall of the first finger below the first relief cut, an upper engagement portion between the first relief cut and the second relief cut, a central lower engagement portion between the second relief cut and the third relief cut, an upper engagement portion between the third relief cut and the fourth relief cut, and an outer lower engagement portion on the outer side wall of the second finger below the fourth relief cut. In another aspect, the first finger includes a first outer edge, the connecting segment includes a second outer edge and the second finger includes a third outer edge, the first outer edge being substantially concave between a lower end of the outer side wall of the first finger and a central portion of the upper wall of the first finger, the first outer edge and the second outer edge being substantially concave between the central portion of the upper wall of the first finger and a central portion of a lower wall of the connecting segment, the second outer edge and the third outer edge being substantially concave between the central portion of the lower wall of the connecting segment and a central portion of the upper wall of the second finger, and the third outer edge being substantially concave between the central portion of the upper wall of the second finger and a lower end of the outer side wall of the second finger. In another aspect, the intake duct is injection molded rubber. In yet another aspect, the flexible body includes a first segment extending from the first end, a second segment extending from the second end, and a ribbed expansion joint connecting the first segment and the second segment. In a variant of this aspect, the interface extends from the second segment.

In yet another embodiment, the present disclosure provides an exhaust shield to reduce the sound emanating from an exhaust pipe of a vehicle, comprising: an intake section including an upper wall, a side wall and a lower wall, the upper wall, the side wall and the lower wall sharing a common forward edge; and a diffuser section including an upper wall with a rearward edge and a forward edge connected to the upper wall of the intake section, a side wall with a rearward edge and a forward edge connected to the side wall of the intake section, and a lower wall with a rearward edge and a forward edge connected to the lower wall of the intake section; wherein the intake section is disposed adjacent and partially rearward of the exhaust pipe relative to a direction of travel of the vehicle when the exhaust shield is mounted to a side wall of the vehicle; wherein the intake section and the diffuser section at least partially define a flow passageway for exhaust gasses exiting the exhaust pipe from the common forward edge to the rearward edges of the upper wall, the side wall and the lower wall of the diffuser section; and wherein the intake section has a first internal area adjacent the diffuser section that is smaller than a second internal area of the intake section adjacent the common forward edge. In one aspect, this embodiment further comprises an acoustic layer attached to an inner surface of the side wall of the diffuser section. In a variant of this aspect, a first segment of the acoustic layer is attached to an inner surface of the upper wall of the diffuser section, and a second segment of the acoustic layer is attached to an inner surface of the lower wall of the diffuser section. In another aspect, the upper wall of the intake section extends from and is angled upwardly relative to the upper wall of the diffuser section, the side wall of the intake section extends from and is angled outwardly relative to the side wall of the diffuser section, and the lower wall of the intake section extends from and is angled downwardly relative to the lower wall of the diffuser section.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
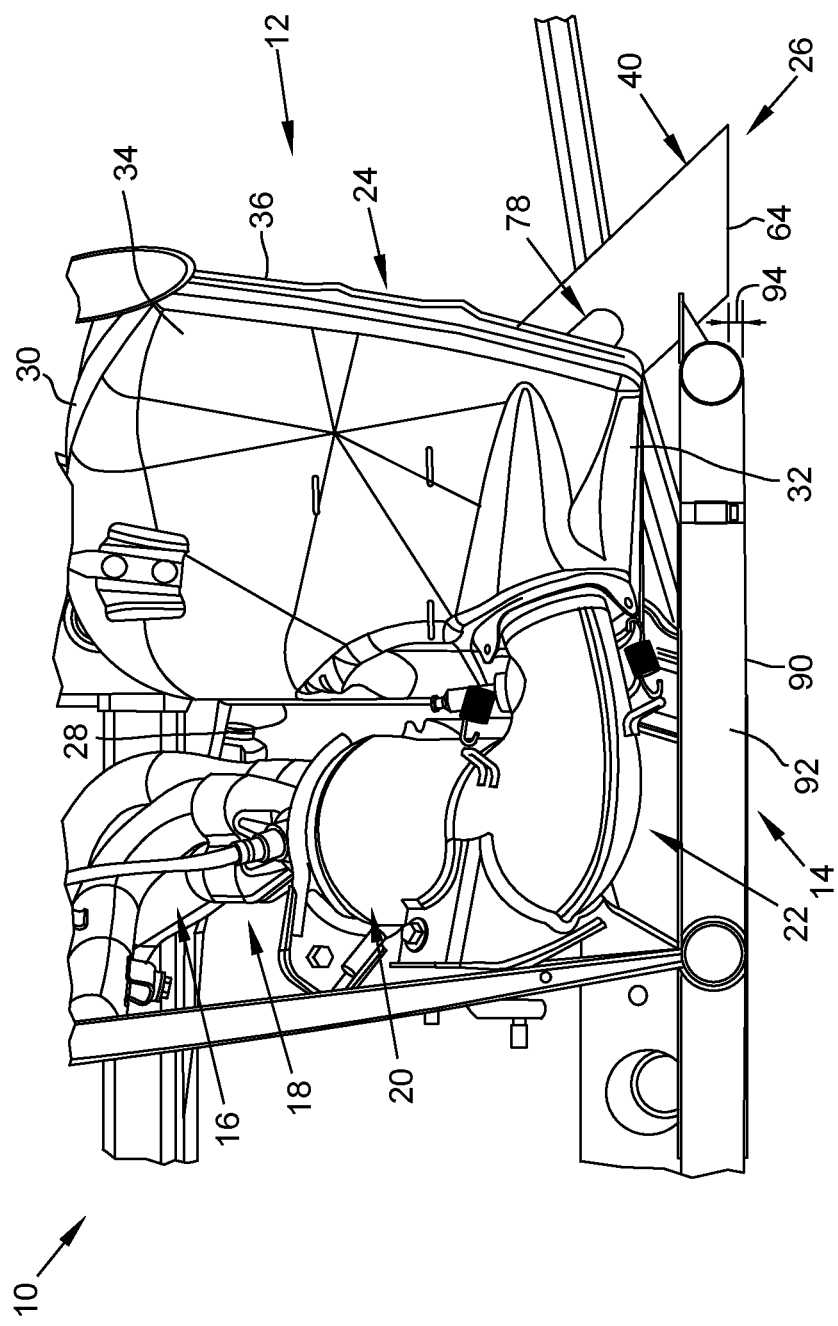
FIG. 1 is a perspective view of an exhaust system according to one embodiment of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples," "coupled," "coupler," and variations thereof are used to include both arrangements wherein two or more components are in direct physical contact and arrangements wherein the two or more components are not in direct contact with each other (e.g., the components are "coupled" via at least a third component, but still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Referring now to FIG. 1, a portion of a vehicle 10 is shown including an exhaust system 12 mounted to a frame 14. In the example show, the vehicle 10 is an autocycle, but the teachings of the present disclosure may have application on any number of different types of vehicles such as, but not limited to, all-terrain vehicles, utility task vehicles, snowmobiles, motorcycles, etc. The exhaust system 12 generally includes a plurality of primary exhaust tubes 16 connected to a flange and the cylinder head (not shown) of an engine (not shown), an exhaust collector 18 connected to the primary exhaust tubes 16 and further described below, a catalytic converter 20 connected to the exhaust collector 18 and further described below, an exhaust headpipe or exhaust manifold outlet tube 22 connected to the catalytic converter 20, a muffler 24 connected to the exhaust headpipe or exhaust manifold outlet tube 22, and a vented exhaust outlet 26 as is further described below.

As shown, the muffler 24 generally includes an inner wall 28 connected to an upper wall 30, a lower wall 32, a forward wall 34 and a rearward wall (not shown). The upper wall 30, the lower wall 32, the forward wall 34 and the rearward wall are also connected to an outer wall 36.

Vented Exhaust Outlet

Figure 2:
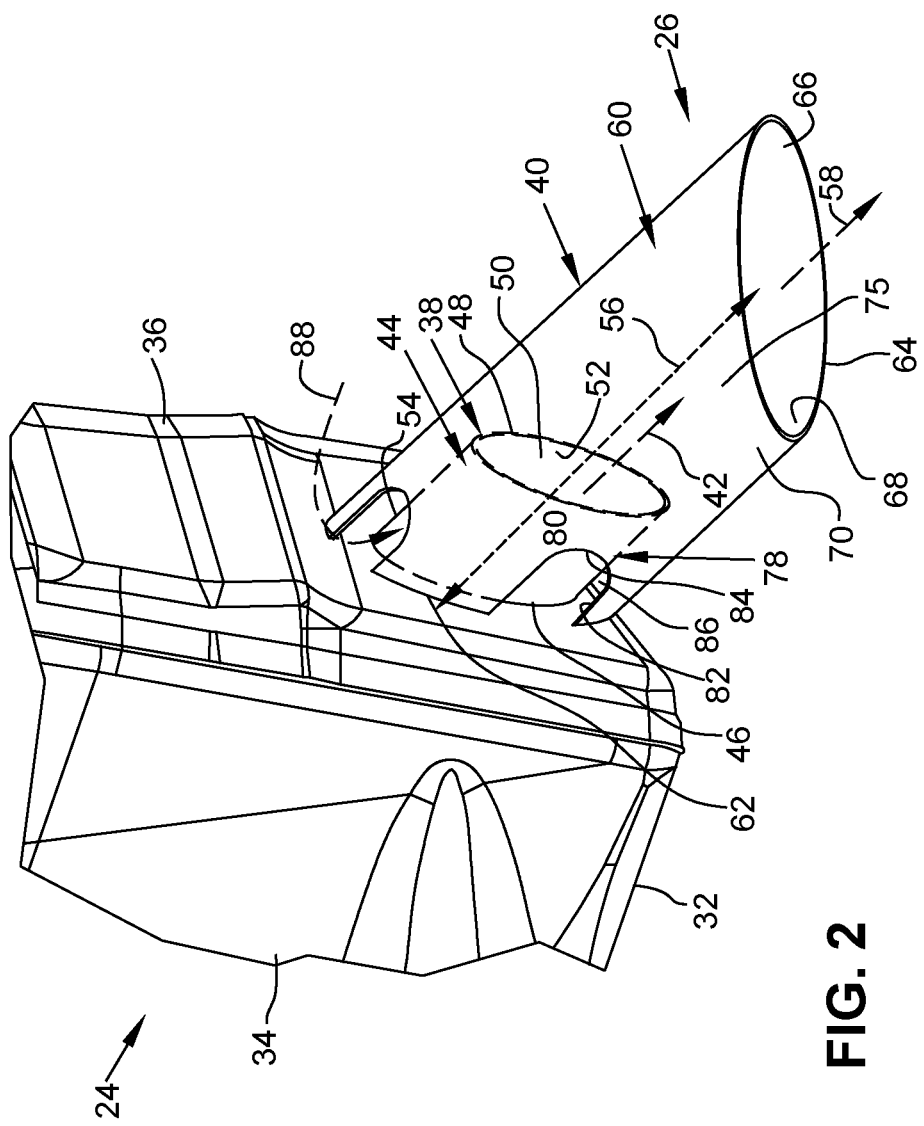
FIGS. 2 and 3 are perspective views of a vented exhaust outlet according to one embodiment of the present disclosure.
Figure 3:
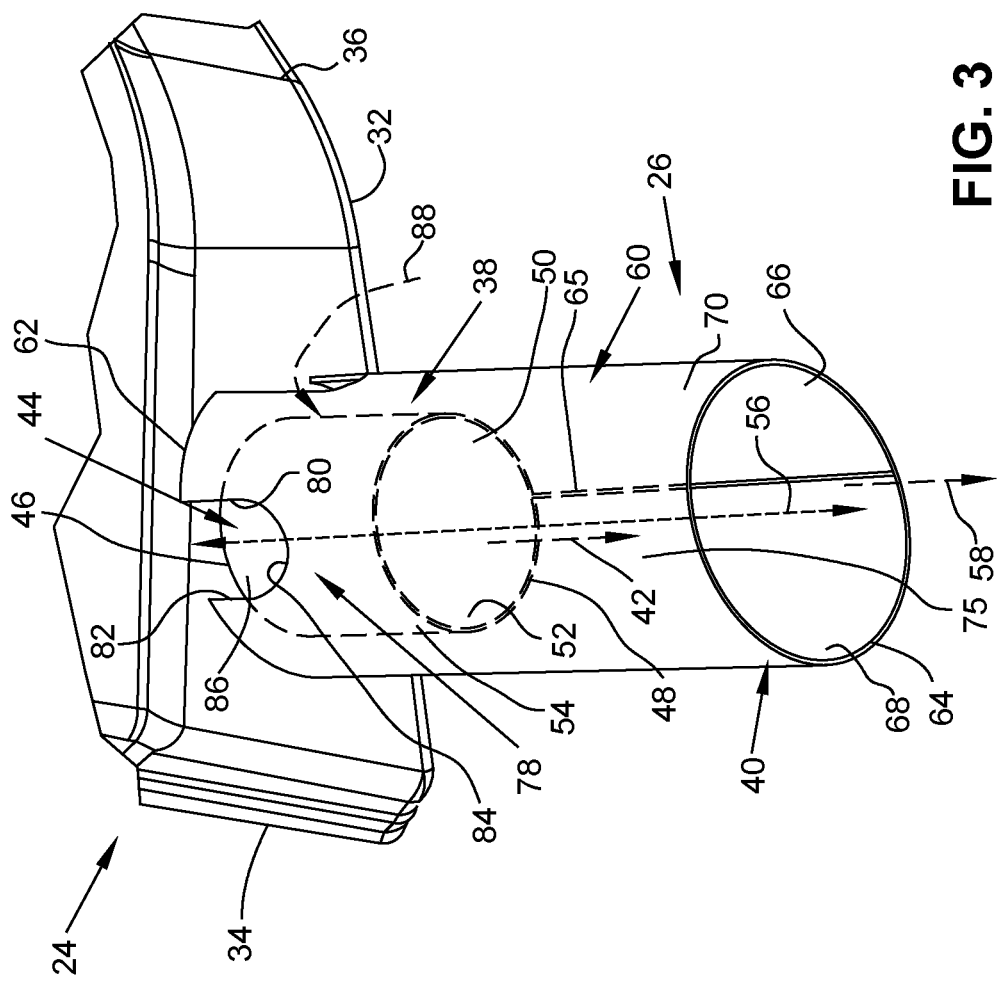
Figure 4:
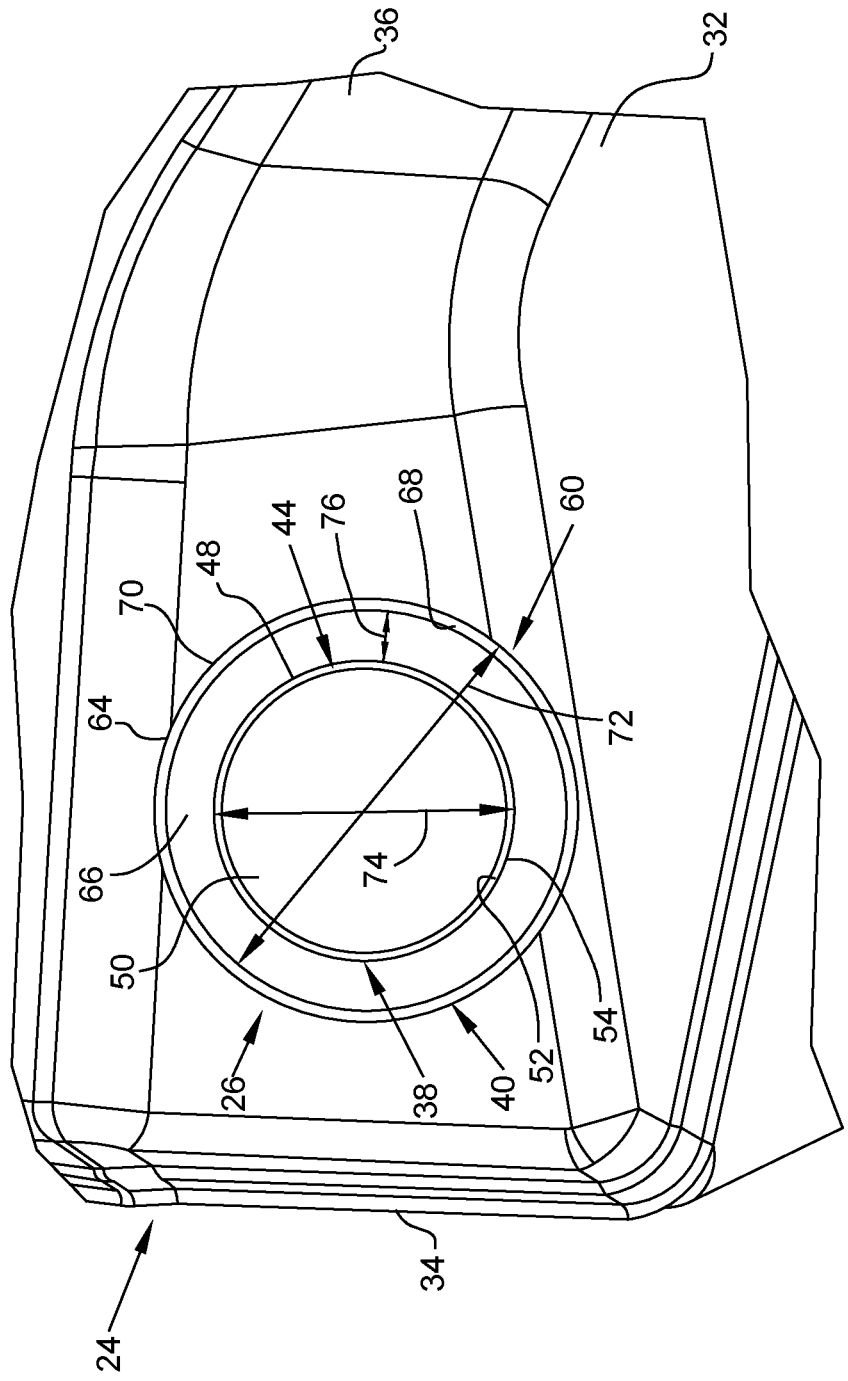
FIG. 4 is an end view of the vented exhaust outlet of FIGS. 2 and 3.

Referring now to FIGS. 2-4, the vented exhaust outlet 26 generally includes an inner tube 38 and an outer tube 40. The inner tube 38 functions as an exhaust pipe carrying hot exhaust gasses 42 from the muffler 24 to ambient air. The inner tube 38 includes a wall 44 extending from a first end 46 connected to the muffler 24 to a second end 48 defining an exhaust opening 50. The inner tube 38 further includes an inner surface 52 and an outer surface 54. The inner tube 38 extends outwardly (away from the outer wall 36 of the muffler 24) and downwardly (away from the upper wall 30 of the muffler 24) at an angle relative to the muffler 24. As such, the first end 46 of the wall 44 defines an oval at its intersection with the outer wall 36 of the muffler 24 lying in a plane that forms an acute angle with a longitudinal axis 56 of the vented exhaust outlet 26. In the depicted embodiment, the second end 48 of the wall 44 also defines an oval lying in a plane that forms an acute angle with the longitudinal axis 56. However, in another embodiment, the second end 48 defines a circle lying in a plane that is substantially perpendicular to the longitudinal axis 56 of the vented exhaust outlet 26.

The outer tube 40 of the vented exhaust outlet 26 functions as a heat shield and exhaust discharge pipe that expels cooled exhaust gasses 58 as is further described below. The outer tube 40 includes a wall 60 extending from a first end 62 connected to the muffler 24 to a second end 64 defining a discharge opening 66 which is positioned outside the body of the vehicle 10. The outer tube 40 is a rolled tube formed from a flat sheet of metal welded together at a seam 65 (FIG. 3). The outer tube 40 further includes an inner surface 68 and an outer surface 70. The outer tube 40 extends outwardly (away from the outer wall 36 of the muffler 24) and downwardly (away from the upper wall 30 of the muffler 24) at an angle relative to the muffler 24. As such, the first end 62 of the wall 60 defines an oval at its intersection with the outer wall 36 of the muffler 24 lying in a plane that forms an acute angle with a longitudinal axis 56 of the vented exhaust outlet 26. The first end 62 of the wall 60 of the outer tube 40 is welded directly to the muffler 24. The second end 64 of the wall 60 defines an oval lying in a plane that forms an acute angle with the longitudinal axis 56 of the vented exhaust outlet 26. As should be apparent from the figures, the plane of the oval defined by the first end 46 of the wall 44 of the inner tube 38 is the same as the plane of the oval defined by the first end 62 of the wall 60 of the outer tube 40. The plane of oval defined by the second end 64 of the wall 60 is substantially parallel with the ground as is shown in FIG. 1. While the ends of the inner tube wall 44 and the outer tube wall 60 are described above as being planar, it should be understood that in certain embodiments the ends may be non-continuous and/or non-planar.

As best shown in FIG. 4, the wall 60 of the outer tube 40 is concentric with the wall 44 of the inner tube 38. The wall 60 of the outer tube 40 has a larger inner diameter 72 than the outer diameter 74 of the wall 44 of the inner tube 38. Thus, a circumferential gap 76 of the vented exhaust outlet 26 is formed by the wall 60 of the outer tube 40 and the wall 44 of the inner tube 38 and extends from the muffler 24 to the second end 48 of the inner tube 38. The second end 48 of the inner tube 38 is positioned within the wall 60 of the outer tube 40 such that hot exhaust gasses 42 from the muffler 24 are expelled from the inner tube 38 into a volume 75 defined by the wall 60 of the outer tube 40.

Referring to FIGS. 2 and 3, the wall 60 of the outer tube 40 further defines a plurality of vents 78 adjacent the first end 62 of the wall 60. In the depicted embodiment, four vents 78 are shown angularly spaced evenly around the circumference of the wall 60. Each of the vents 78 includes a first side edge 80 extending from the first end 62 of the wall 60, a second side edge 82 extending from the first end 62 of the wall 60 in substantially parallel relationship to the first side edge 80, and a curved outer edge 84 extending between the first side edge 80 and the second side edge 82. Together the muffler 24, the first side edge 80, the second side edge 82 and the curved outer edge 84 define a vent opening 86 configured to receive ambient air 88 drawn into the vented exhaust outlet 26 as is further described below.

The velocity of the hot exhaust gasses 42 exiting the inner tube 38 results in a low pressure area at the plurality of vents 78 of the wall 60 of the outer tube 40 which draws the ambient air 88 into the vent openings 86. The ambient air 88 mixes with the hot exhaust gasses 42 to produce the cooled exhaust gasses 58 that are discharged from the discharge opening 66 of the wall 60 of the outer tube 40. The cooler ambient air 88 provides an insulating and cooling barrier, or a curtain of cool air, between the hot exhaust gasses 42 and the wall 60 of the outer tube 40. This reduces the temperature of the outer tube 40 thereby reducing the heat radiated to the nearby surrounding bodywork. Additionally, the orientation of the second end 64 and the discharge opening 66 of the outer tube 40 directs the cooled exhaust gasses 58 downwardly rather than outwardly, thereby reducing the likelihood that the cooled exhaust gasses 58, which are still relatively high temperature, will be blown directly at the feet or ankles of a person near the vehicle 10. Moreover, the orientation of the discharge opening 66 reduces the noise emanating from the vented exhaust outlet 26 by directing the cooled exhaust gasses 58 toward the ground.

Finally, as best shown in FIG. 1, the plane of the second end 64 of the outer tube 40 is slightly above (relative to the ground) a lowermost surface 90 of a lower frame member 92 of the frame 14 of the vehicle 10. This location of the second end 64 of the outer tube 40 provides a maximum downward location of the discharge opening 66 while still avoiding the possibility that the outer tube 40 will bottom out and make contact with the ground. In one embodiment of the present disclosure, the vertical distance 94 between the second end 64 of the wall 60 of the outer tube 40 and the lowermost surface 90 of the lower frame member 92 is approximately 10 mm.

Flow Distribution Exhaust Collector

Referring back to FIG. 1, the exhaust collector 18 of the exhaust system 12 of the present disclosure is further described below. As shown, the exhaust collector 18 is connected between the catalytic converter 20 and the primary exhaust tubes 16 to collect the exhaust gasses from the primary exhaust tubes 16 and deliver them to the catalytic converter 20.

Figure 5:
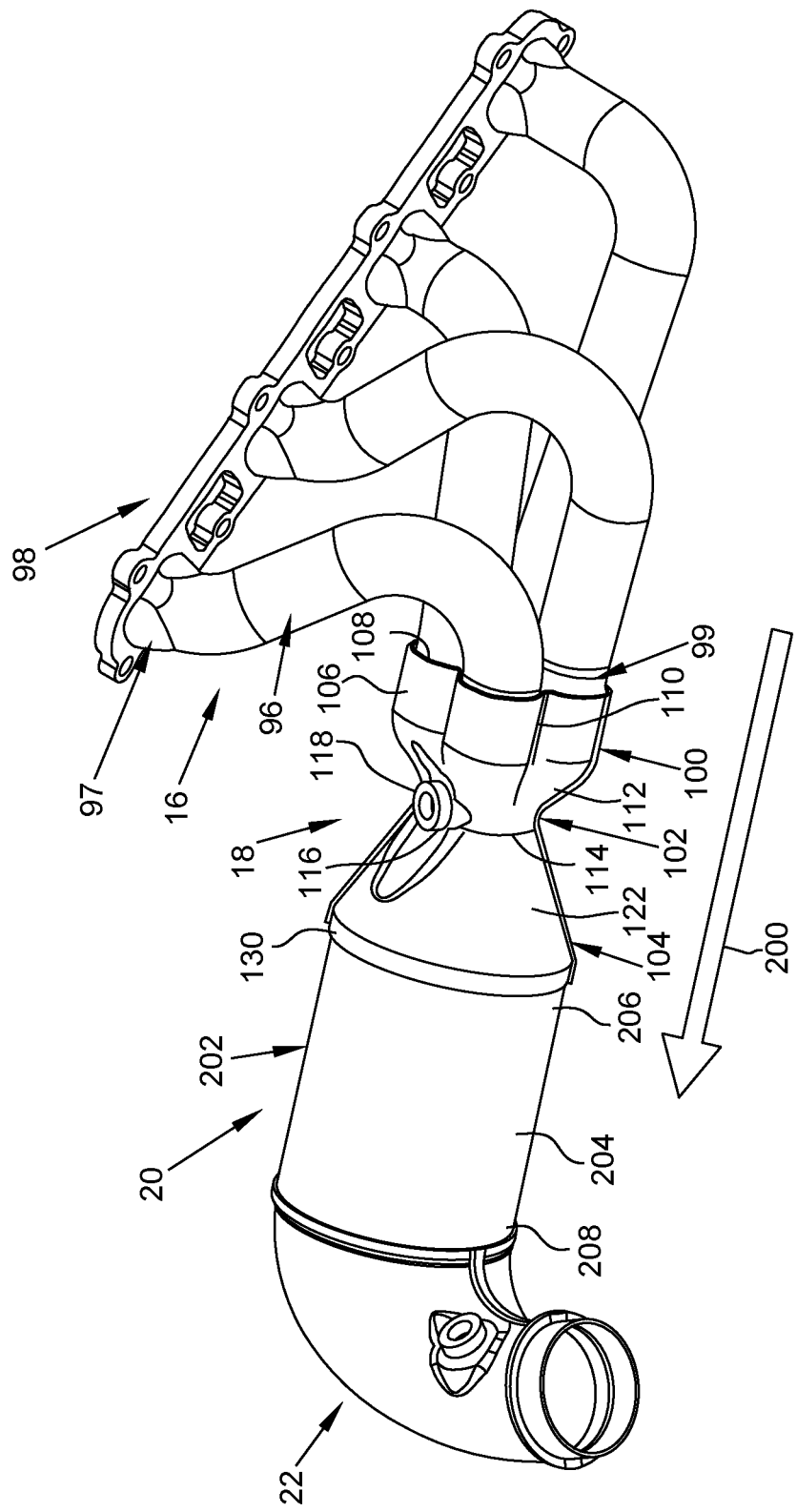
FIG. 5 is a perspective view of a portion of the exhaust system of FIG. 1.
Figure 7:
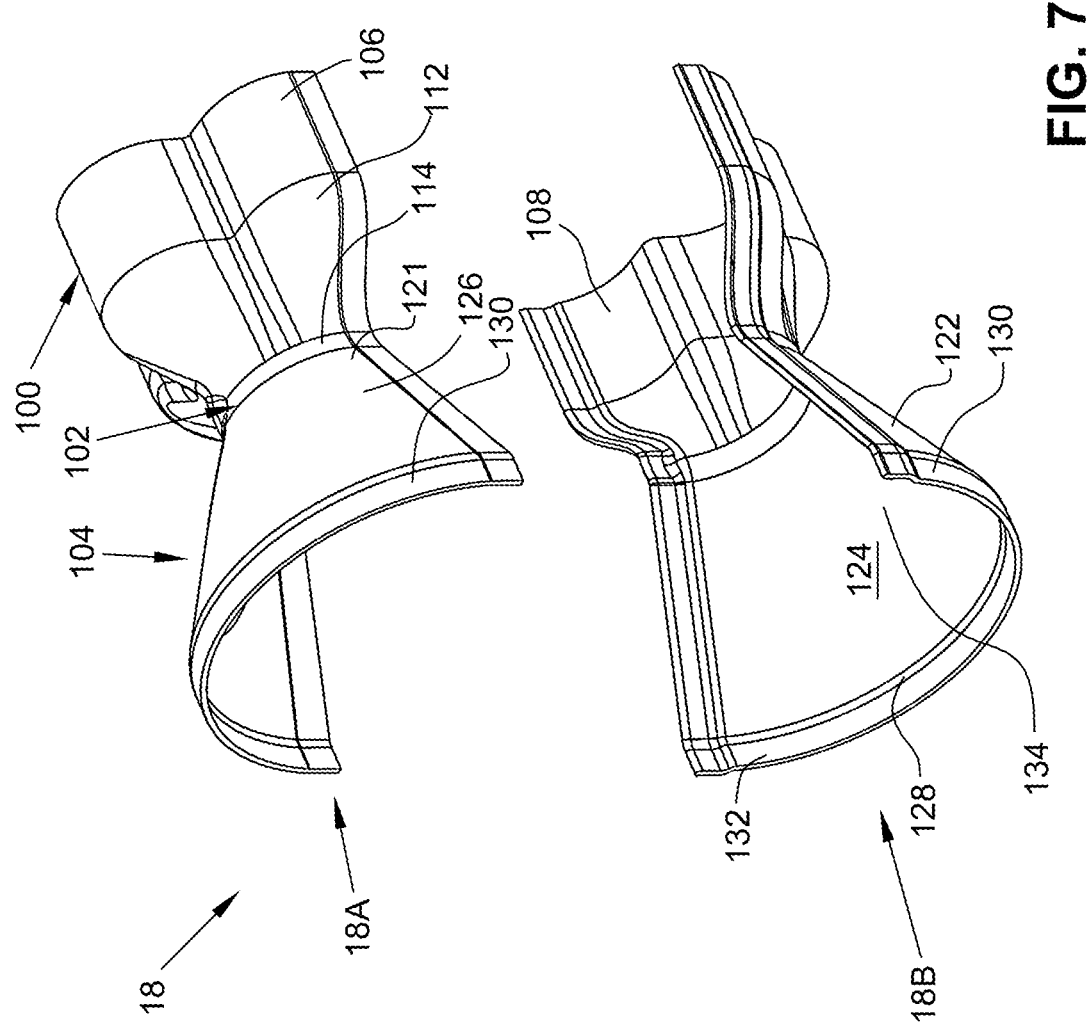
FIG. 7 is a perspective exploded view of the exhaust collector of FIG. 6.
Figure 8:
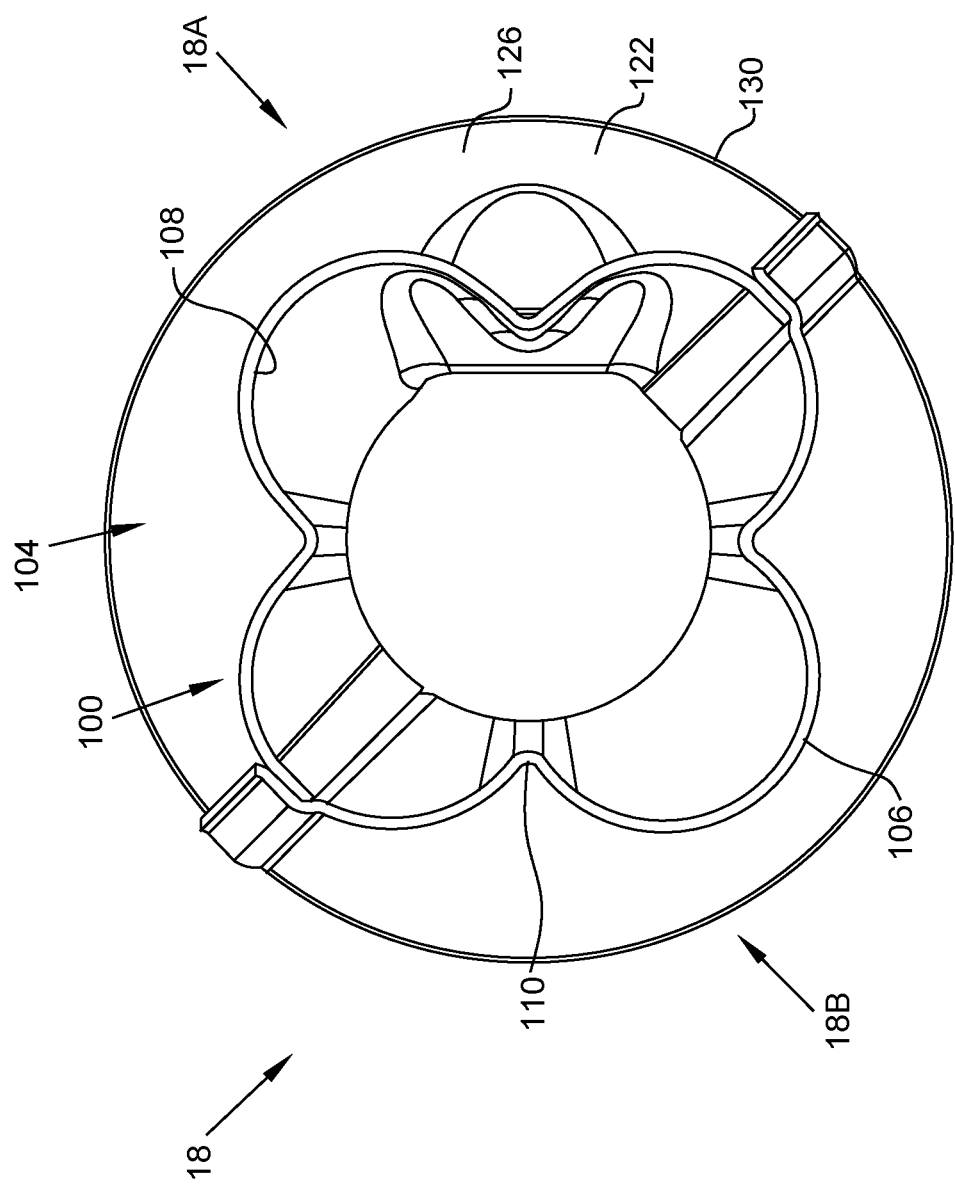
FIG. 8 is an end view of the exhaust collector of FIG. 6.

Referring now to FIG. 5, the primary exhaust tubes 16 are shown as each having a different shaped body 96 with an inlet end 97 connected to an exhaust manifold bracket 98 and an outlet end 99 connected to the exhaust collector 18. The exhaust collector 18 generally includes an inlet body 100 configured to connect to the outlet ends 99 of the primary exhaust tubes 16, a neck body 102 in flow communication with the inlet body 100, and an expansion cone 104 in flow communication with the neck body 102 and configured to deliver exhaust gasses to the catalytic converter 20. The exhaust collector 18 is formed from two halves 18A and 18B (FIG. 7). As best shown in FIG. 8, the inlet body 100 is clover-shaped with four substantially cylindrical receiver segments 106, each defining an inlet opening 108 for receiving an outlet end 99 of a primary exhaust tube 16. In the depicted embodiment, the inlet openings 108 of the receiver segments 106 lie in substantially the same plane. Recesses or valleys 110 are formed between adjacent receiver segments 106. The inlet body 100 further includes a transition wall 112 that transitions into the neck body 102.

Figure 6:
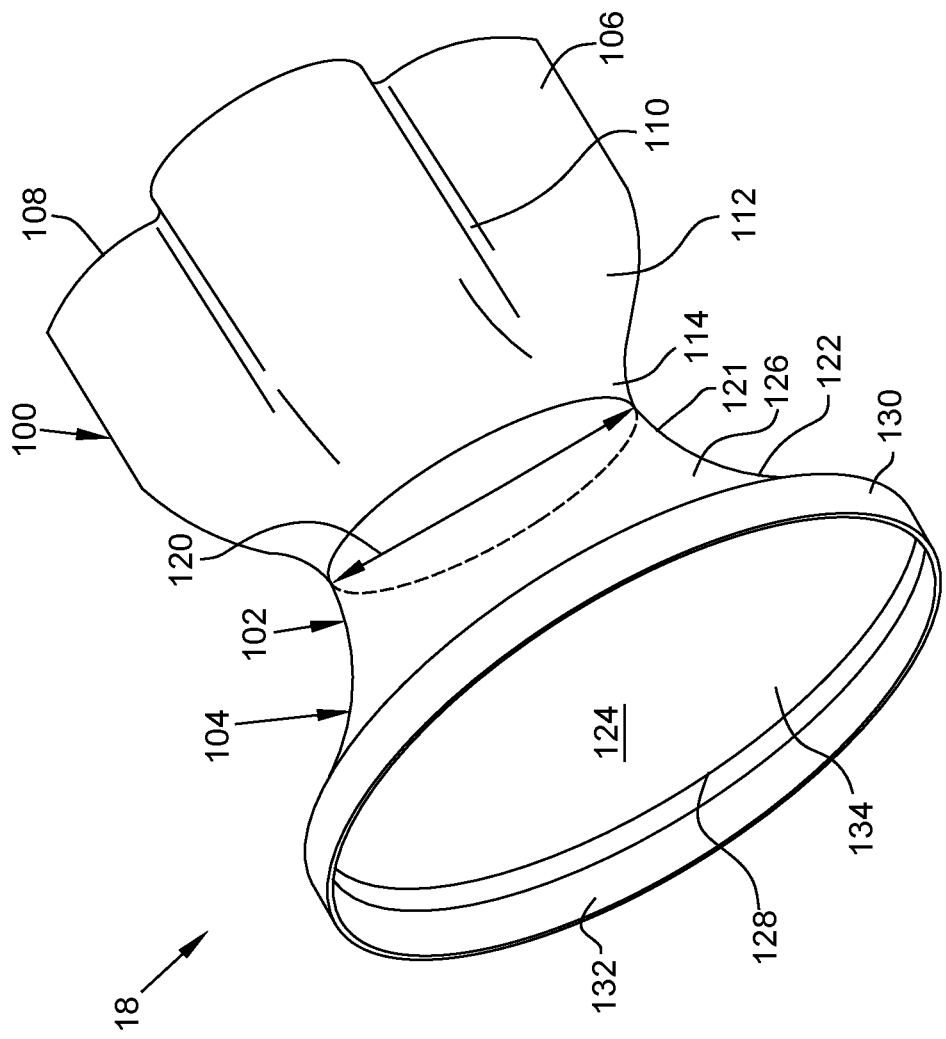
FIG. 6 is a perspective view of an exhaust collector according to one embodiment of the present disclosure.

The neck body 102 includes a partially cylindrical wall 114 having an opening 116. An oxygen sensor 118 is mounted within the opening 116. The oxygen sensor 118 is positioned to sense concentrations of oxygen in the exhaust gasses flowing through the neck body 102. The narrow neck body 102 places the oxygen sensor 118 closer to the concentrated exhaust from the primary exhaust tubes 16 to permit more accurate measurements. As best shown in FIG. 6, the cylindrical wall 114 of the neck body 102 has an inner diameter 120. The neck body 102 further includes a transition wall 121 extending between the cylinder wall 114 and the expansion cone 104.

Referring now to FIGS. 5 and 6, the expansion cone 104 includes a conical wall 122 that extends from the cylindrical wall 114 of the neck body 102. The conical wall 122 has an inner surface 124 and an outer surface 126. The conical wall 122 terminates at a circumferential ridge 128 from which an outer lip 130 is formed. The outer lip 130 includes an inner surface 132 which is sized to mate with an outer surface of the catalytic converter 20. Together the inlet body 100, the neck body 102 and the expansion cone 104 form a flow passage through which exhaust gasses flow from the primary exhaust tubes 16 to the catalytic converter 20.

Figure 9:
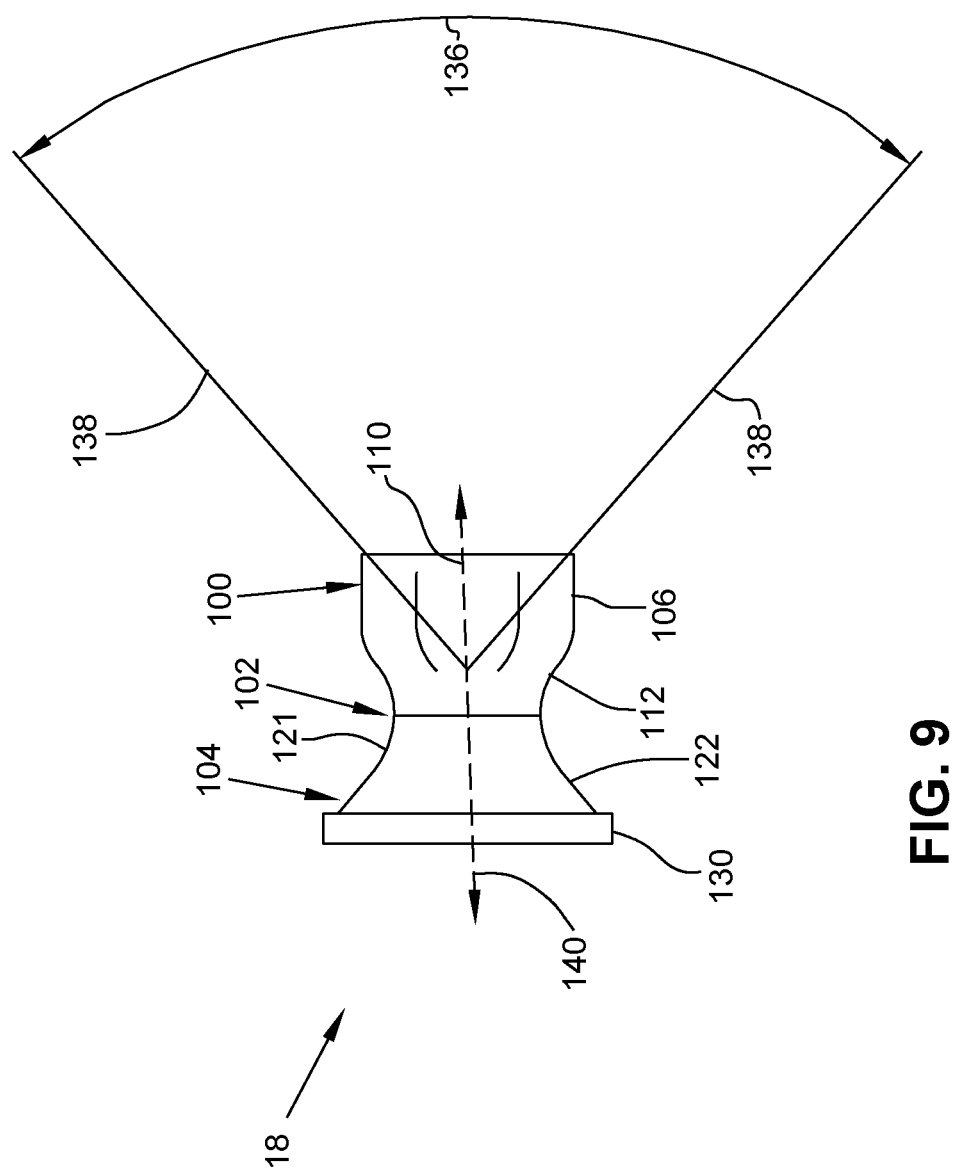
FIGS. 9 and 10 are side views of the exhaust collector of FIG. 6.

Referring now to FIG. 9, the conical wall 122 of the expansion cone 104 defines an expansion angle 136. More specifically, the inner surface 124 (FIGS. 6 and 7) of the conical wall 122 has linear tangent lines 138 that intersect at a longitudinal axis 140 of the exhaust collector 18. Extensions of the tangent lines 138 form the expansion angle 136 of the expansion cone 104.

Figure 10:
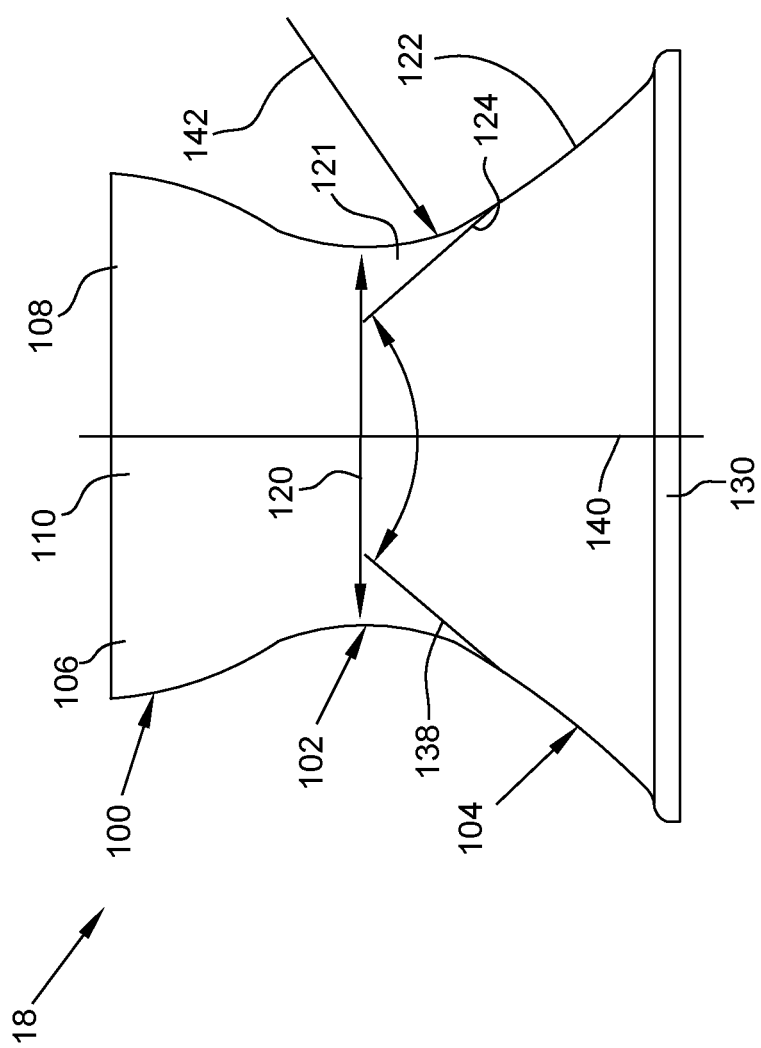

Referring now to FIG. 10, the transition wall 121 of the neck body 102 defines a transition radius 142. More specifically, the transition wall 121 forms an arc with a constant radius (the transition radius 142) between the inner diameter 120 of the neck body 102 and the inner surface 124 of the conical wall 122 of the expansion cone 104.

As should be apparent from the foregoing, the inner diameter of the exhaust collector 18 decreases along the transition wall 112 of the inlet body 100 to a minimum inner diameter (i.e., inner diameter 120 of the cylindrical wall 114 of the neck body 102), and increases from the minimum inner diameter along the transition wall 121 and the conical wall 122 of the expansion cone 104, to the outer lip 130. In other words, the inner diameter of the exhaust collector 18 continually decreases from the receiver segments 106 to the inner diameter 120 of the cylindrical wall 114 of the neck body 102 and continually increases from the inner diameter 120 to the outer lip 130 of the expansion cone 104.

The exhaust collector 18 is configured to deliver exhaust gasses to the inlet face (described below) of the catalytic converter 20 in a manner such that the mass of the exhaust gasses is substantially evenly distributed (with maximum uniformity given the size restraints of the exhaust collector 18) across the inlet face, thereby improving the performance of the catalytic converter 20. In other words, by evenly distributing the exhaust gasses delivered to the inlet face of the catalytic converter 20, the exhaust flows through the cells (described below) of the inlet face more slowly which improves the performance of the catalytic converter 20 and decreases emissions.

The inner diameter 120 of the neck body 102 is designed to be sufficiently small to accommodate a relatively large expansion angle 136 of the conical wall 122 of the expansion cone 104. The inner diameter 120 of the neck body 102 and the expansion angle 136 of the conical wall 122 of the expansion cone 104 define the corresponding transition radius 142 of the transition wall 121 of the neck body 102. In one embodiment, the inner diameter 120 of the neck body 102 is within a range of between 45 mm and 75 mm. Preferably, the inner diameter 120 of the neck body 102 is approximately 50 mm. In certain embodiments, the inner diameter 120 is approximately equal to twice the cross-sectional area of a primary exhaust tube 16 (FIG. 5). The expansion angle 136 defined by the tangent lines 138 of the conical wall 122 of the expansion cone 104 is, in one embodiment, within a range of between 50 degrees and 130 degrees. With an inner diameter 120 of approximately 50 mm, the expansion angle 136 is approximately 52.9 degrees.

In certain embodiments, the maximum uniformity mentioned above is constrained by the relationship between the outer diameter 120 of the neck body 102 and the expansion angle 136 of the conical wall 122 of the expansion cone 104. One constraint may be the minimum angle relationship defined by the outer diameter 120+the expansion angle 136 being greater than or equal to 120. Another constraint may be the maximum angle relationship defined by 1.8*the outer diameter 120+the expansion angle 136.

Dual Foil Thickness and Cell Density Single Mantle Catalytic Converter

Referring back to FIG. 5, a catalytic converter 20 according to the teachings of the present disclosure is shown coupled to the exhaust collector 18 described above. As shown and should be apparent from the foregoing, the flow direction 200 of the exhaust gasses is from the primary exhaust tubes 16, through the exhaust collector 18 and into the catalytic converter 20. Because the application shown there is very little distance between the catalytic converter 20 and the outlet ends 99 of the primary exhaust tubes 16, the catalytic converter 20 is considered a "close coupled" catalytic converter. While such close coupling provides minimal light off time for the catalytic converter 20 (i.e., at least a portion of the catalytic converter 20 quickly reaches the light-off temperature at which the chemicals in the catalytic converter 20 are activated to begin reducing emissions in the exhaust gasses), it also places additional demands on the catalytic converter 20. Specifically, the close coupled location of the catalytic converter 20 increases the severity of the temperature fluctuations, pressure pulses and high-velocity turbulent flow that the catalytic converter 20 needs to withstand.

Moreover, as is further described below, the ability of the catalytic converter 20 to reduce exhaust emissions increases with the density of the cells (i.e., cells per square inch or "CPSI") in the matrix brick through which the exhaust passes in the catalytic converter 20. Higher cell density provides increased surface area, which improves emissions performance. However, a high CPSI of the matrix brick resulting from use of a relatively thin foil as described below is less durable than a brick formed from a thicker foil, but thicker foil results in lower CPSI and therefore lower emissions performance. Accordingly, there is a trade-off between the durability of the matrix brick and its emissions performance. Highly durable matrix bricks (i.e., bricks with relatively lower CPSI resulting from use of a thicker foil) have lower emissions performance and lower durability matrix bricks (i.e., bricks with relatively higher CPSI) have higher emissions performance.

Still referring to FIG. 5, the catalytic converter 20 includes a mantle tube 202 formed as a substantially cylindrical wall 204 having an inlet end 206 and an outlet end 208. The inlet end 206 of the mantle tube 202 is received by and coupled to the outer lip 130 of the exhaust collector 18 and the outlet end 208 is coupled to the muffler intake duct 22.

Figure 11:
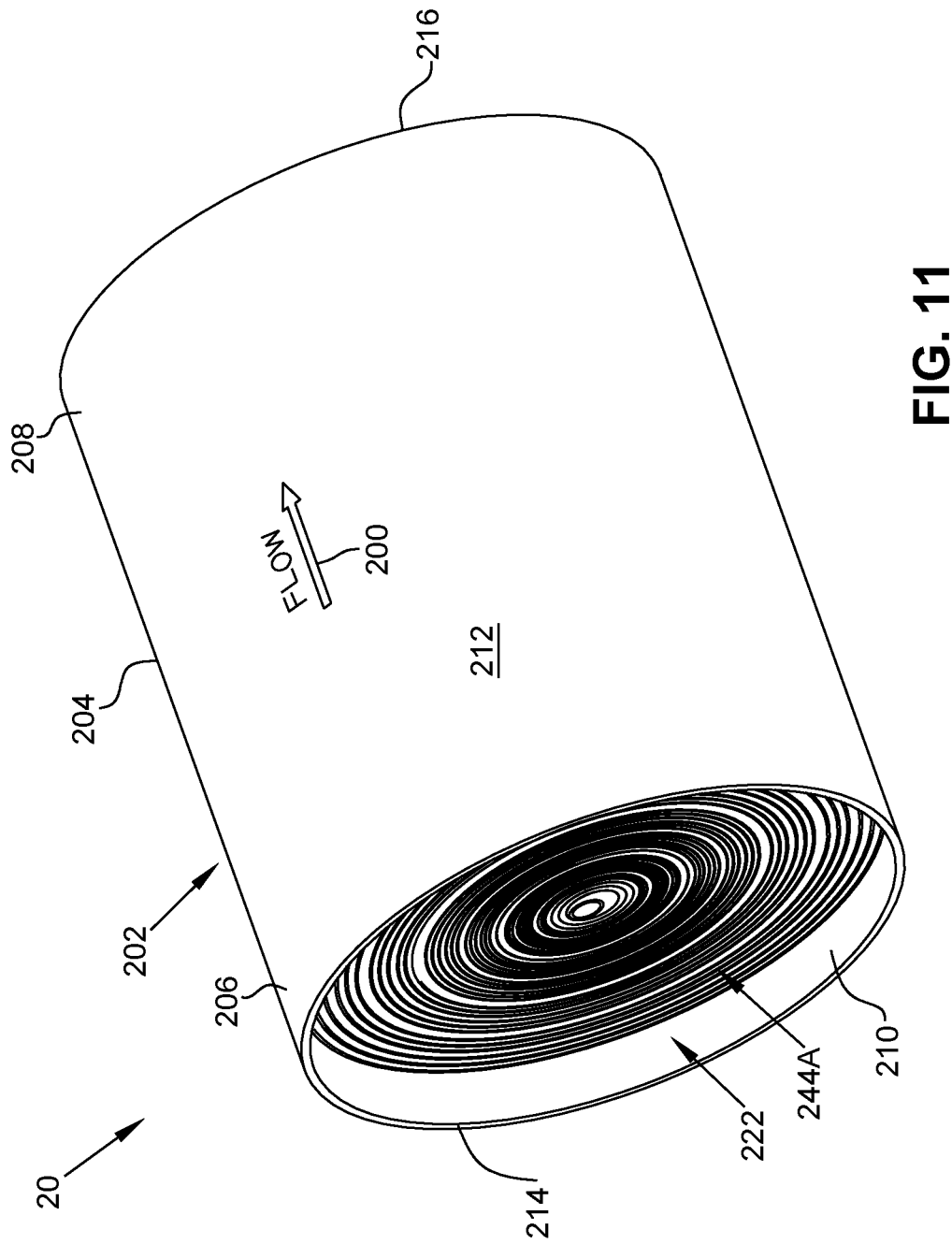
FIG. 11 is a perspective view of a catalytic converter according to one embodiment of the present disclosure.
Figure 12:
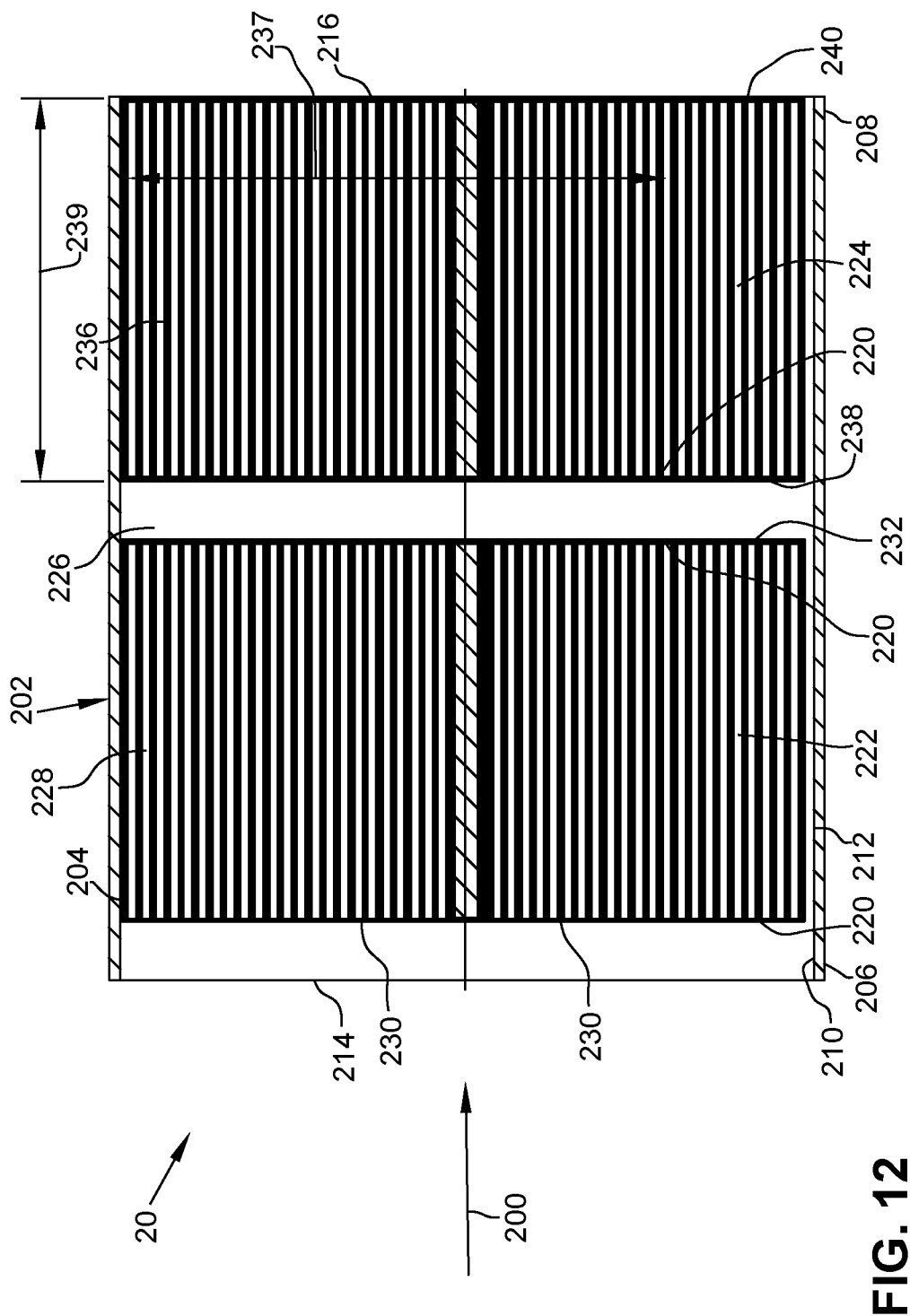
FIG. 12 is a cross-sectional side view of the catalytic converter of FIG. 10.

Referring now to FIGS. 11 and 12, the cylindrical wall 204 of the mantle tube 202 includes an inner surface 210 that defines a flow passageway 211 through the mantle tube 202, an outer surface 212, an inlet edge 214 at the inlet end 206, and an outlet edge 216 at the outlet end 208.

The inner surface 210 of the cylindrical wall 204 includes a plurality of retaining surfaces 220 positioned and configured to retain an inlet matrix brick 222 and an outlet matrix brick 224 in place within the mantle tube 202. The inlet matrix brick 222 and the outlet matrix brick 224 are spaced apart from one another by a central portion 226 of the cylindrical wall 204 of the mantle tube 202. The central portion 226 provides spacing between the inlet matrix brick 222 and the outlet matrix brick 224, which introduces turbulence in the flow of exhaust gasses entering the outlet matrix brick 224. This increased turbulence results in improved emissions performance of the outlet matrix brick 224 as increased turbulence improves the gasses exposure to the catalyst precious metal and washcoat on the outlet matrix brick 224.

The inlet matrix brick 222 generally includes a matrix body 228 having an inlet end 230 positioned adjacent the inlet end 206 of the mantle tube 202, and an outlet end 232 positioned adjacent the central portion 226 of the cylindrical wall 204 of the mantle tube 202. Similarly, the outlet matrix brick 224 generally includes a matrix body 236 having an inlet end 238 positioned adjacent the central portion 226 of the cylindrical wall 204 of the mantle tube 202, and an outlet end 240 positioned adjacent the outlet end 208 of the mantle tube 202. Each of the inlet matrix brick 222 and the outlet matrix brick 224 have a diameter 237 and a length 239.

Figure 13:
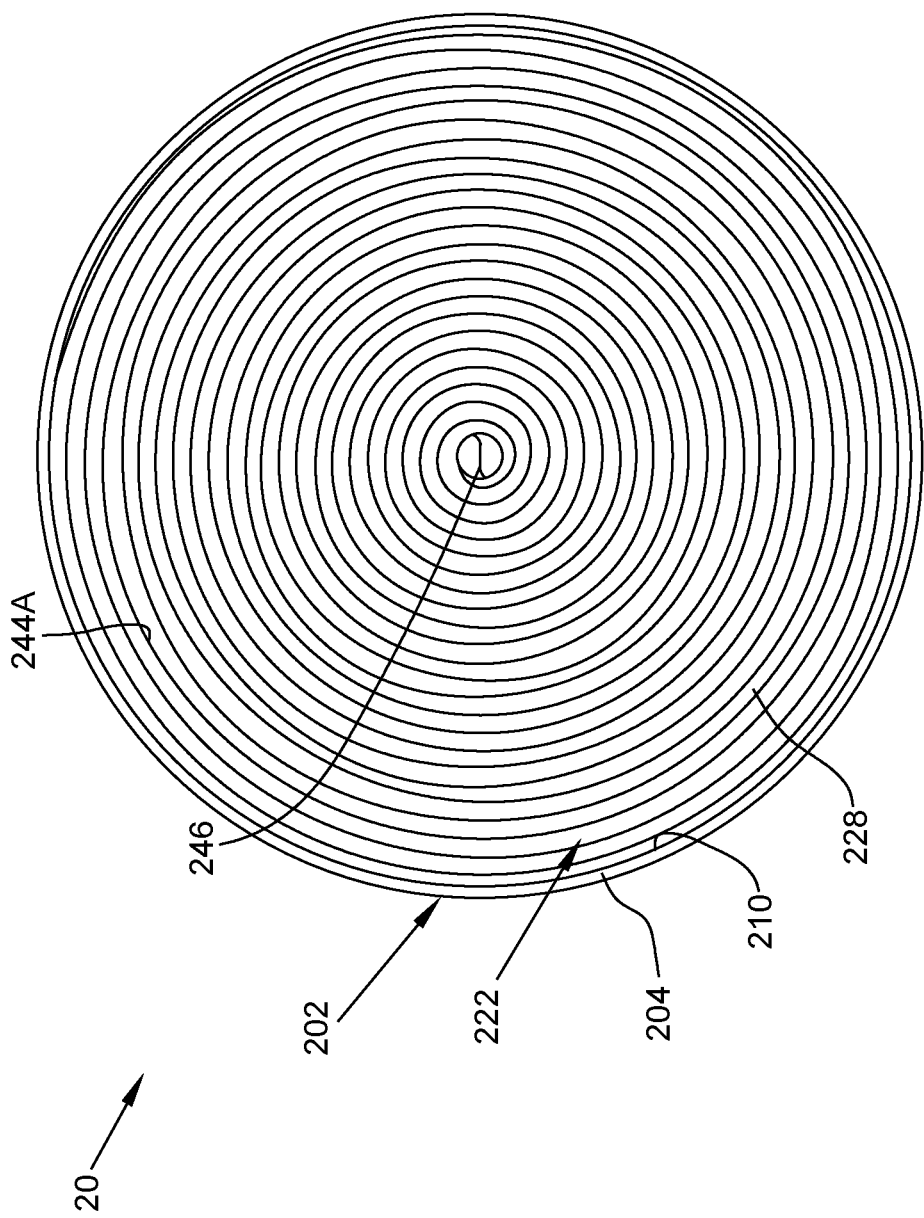
FIG. 13 is an end view of the catalytic converter of FIG. 10.

Referring now to FIG. 13, an end view of the inlet matrix brick 222 is shown positioned within the mantle tube 202. As is further described below, the outlet matrix brick 224 of the catalytic converter 20 has the same general shape as the inlet matrix brick 224 (with a higher CPSI density), so only the inlet matrix brick 222 is described herein. The matrix body 228 of the inlet matrix brick 222 is formed from a thin corrugated foil 244A as is further described below. The foil 244A is wound onto itself to form a helical coil that extends between the center 246 of the matrix brick 222 and the inner surface 210 of the cylindrical wall 204 of the mantle tube 202, thereby substantially filling the flow passageway 211.

Figure 14:
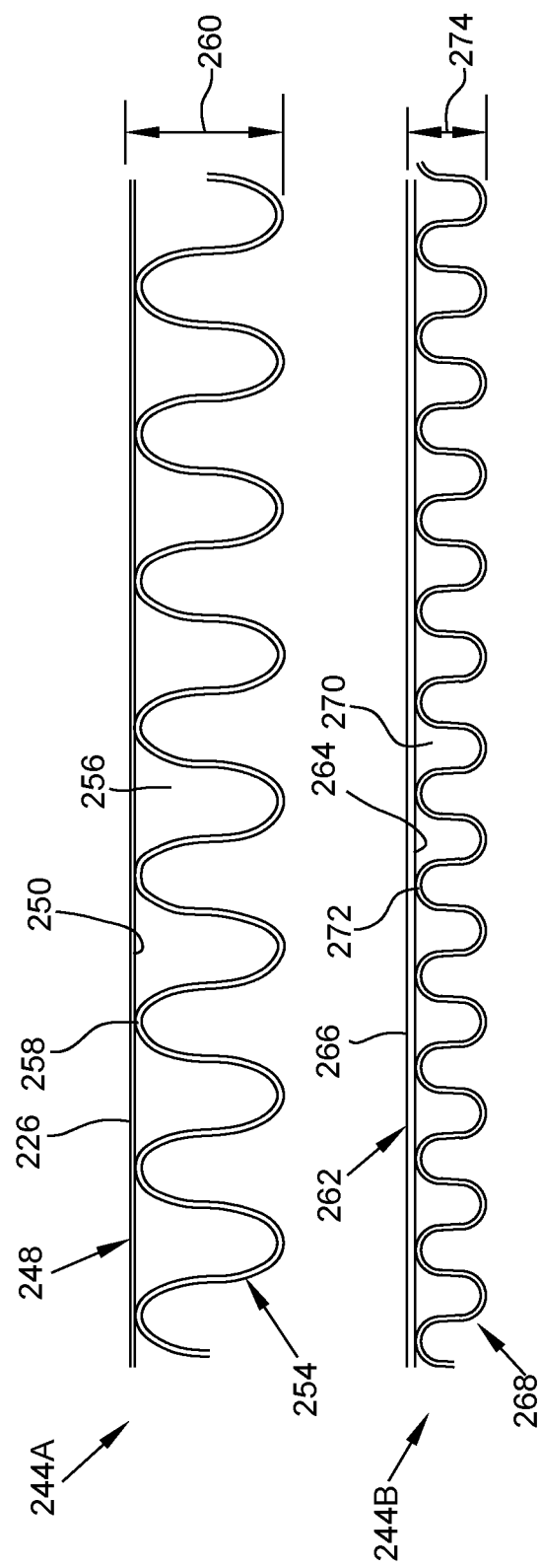
FIG. 14 is a side view of two different foils used to form the catalytic converter of FIG. 10.

As should be understood from the foregoing, the thinner the foil the higher the density of cells (not shown in FIG. 13) and the greater the emissions performance. However, high CPSI density will have a shorter useful life under the harsh conditions of a close coupled catalytic converter 20 as described above. To improve both emissions performance and durability, the catalytic converter 20 according to the present disclosure includes a lower CPSI density and thicker foil inlet matrix brick 222 and a higher CPSI density, thinner foil outlet matrix brick 224. FIG. 14 depicts the foil 244A used to form the matrix body 228 of the inlet matrix brick 222. As shown, the foil 244A includes a backing sheet 248 having an inner surface 250 and an outer surface 252, and a fluted sheet 254 defining a plurality of cells 256. The fluted sheet 254 includes a peak 258 between adjacent cells 252. The peaks 258 are adhered to the inner surface 250 of the backing sheet 248 to form the foil 244A. As is the case with conventional catalytic converter media, the backing sheet 248 and the fluted sheet 254 are formed from metal such as a heat resistant stainless steel and all of the surfaces of the foil 244A are covered by a ceramic based coating (not shown) containing precious metals such as platinum, palladium and rhodium. The foil 244A that forms the lower CPSI density inlet matrix brick 222 has an overall thickness 260.

The foil 244B used to form the matrix body 236 of the outlet matrix brick 224 is also depicted in FIG. 14. As shown, the foil 244B similarly includes a backing sheet 262 having an inner surface 264 and an outer surface 266, and a fluted sheet 268 defining a plurality of cells 270. The fluted sheet 268 includes a peak 272 between adjacent cells 270. The peaks 272 are adhered to the inner surface 264 of the backing sheet 262 to form the foil 244B. As is the case with conventional catalytic converter media, the backing sheet 262 and the fluted sheet 268 are formed from metal such as heat resistant stainless steel and all of the surfaces of the foil 244B are covered by a ceramic based coating (not shown) containing precious metals such as platinum, palladium and rhodium. The foil 244B that forms the higher CPSI density outlet matrix brick 224 has an overall thickness 274.

As illustrated, the thickness 260 of the foil 244A is greater than the thickness 274 of the foil 244B and the cells 256 of the foil 244A are farther apart than the cells 270 of the foil 244B. Accordingly, when the foil 244A is wound to form the matrix body 228 of the inlet matrix brick 222, the CPSI density of the matrix body 228 will be lower than the CPSI density created when the foil 244B is wound to form the matrix body 236 of the outlet matrix brick 224. Additionally, the increased thickness of the foil 244A relative to the foil 244B results in an increase in durability of the inlet matrix brick 222 relative to the outlet matrix brick 224. In other words, the inlet matrix brick 222 is stronger to withstand the high-temperature incoming turbulent exhaust flow and the outlet matrix brick 224 provides greater emissions reduction. Thus, the combination of the inlet matrix brick 222 and the outlet matrix brick 224 provide improved durability relative to a high CPSI density dual matrix brick configuration and improved emissions performance relative to a lower CPSI density dual matrix brick configuration.

According to one embodiment of the present disclosure, the thickness 260 of the foil 244A of the inlet matrix brick 222 is approximately 80 um, which results in a CPSI density of the inlet matrix brick 222 of approximately 300. The thickness 274 of the foil 244B of the outlet matrix brick 224 is approximately 50 um, which results in a CPSI density of the outlet matrix brick 224 of approximately 600. In one embodiment the length 239 of the inlet matrix brick 222 and the outlet matrix brick 224 is approximately 60 mm and the diameter of the inlet matrix brick 222 and the outlet matrix brick 224 is approximately 110 mm.

Rubber Intake Duct

Figure 15:
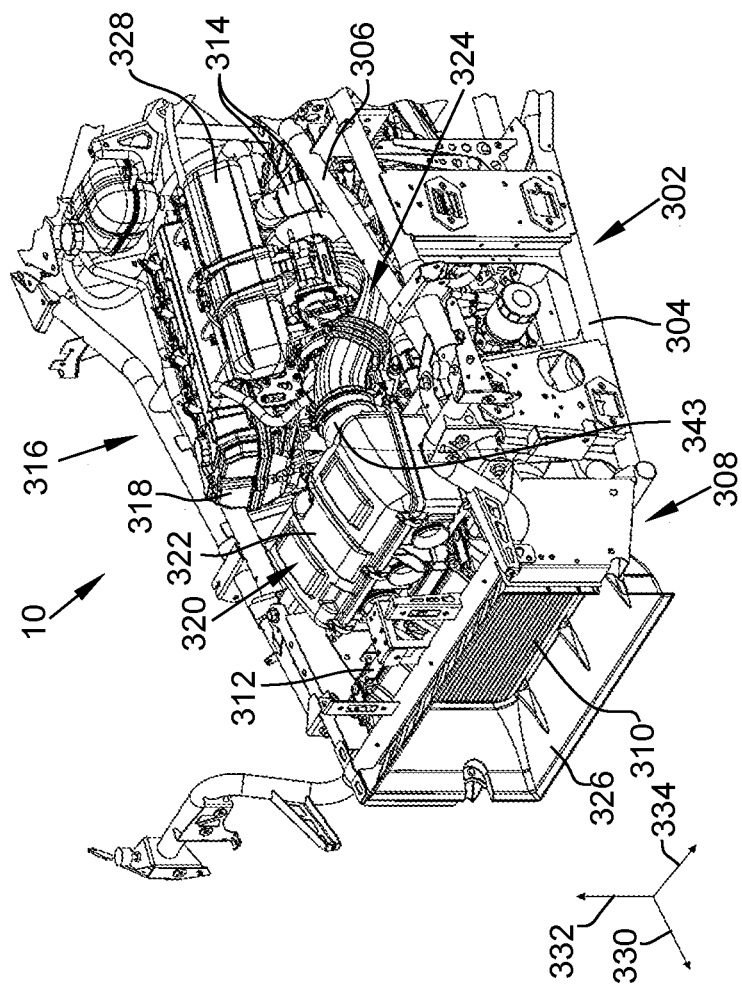
FIG. 15 is a perspective view of an air intake assembly mounted to the frame of a vehicle.

Referring now to FIG. 15, a portion of a vehicle 10 is shown. Vehicle 10 generally includes a frame assembly 302 including a lower longitudinally-extending frame member 304 and an upper longitudinally-extending frame member 306, a cooling assembly 308 including a radiator 310, at least one fan 312 positioned rearward of the radiator 310, and cooling lines 314, a powertrain assembly 316 including an engine 318 supported by the frame assembly 302, and an air intake assembly 320 including an airbox 322 coupled to an intake duct 324 which provides filtered air to the engine 318 as is further described below. The cooling assembly 308 further includes a shroud 326 positioned forward of the radiator 310 for directing air flowing at a front end of the vehicle 10 into the radiator 310. Air flows through inlets into the airbox 322 where it is filtered, and then through the intake duct 324 and into the intake manifold 328 of the engine 318.

In many applications, the engine 318 is mounted to the frame assembly 302 in a manner that permits some movement of the engine 318 during movement of the vehicle 10. More specifically, engine torque during operation of the vehicle 10 causing the engine 318 to roll about the longitudinal axis 330 (or x-axis) of the vehicle 10. It also causes the engine 318 to yaw about the vertical axis 332 (or z-axis) of the vehicle 10, but typically to a lesser extend than the roll motion. Finally, acceleration and deceleration of the vehicle 10 causes the engine 318 to pitch about the lateral axis 334 (or y-axis) of the vehicle 10.

As the engine 318 moves during maneuvering of the vehicle 10, particularly the movement of the engine 318 relative to the airbox 322, the intake duct 324, which in certain embodiments is made of rubber or other suitable, flexible material, moves with the engine 318 relative to the frame assembly 302. Thus, over the lifetime of the vehicle 10, the intake duct 324 will undergo a very large number of movements relative to the frame assembly 302, and in particular relative to the upper longitudinally-extending frame member 306 (hereinafter, "the frame member 306"). As is further described below, the intake duct 324 is positioned in close proximity to the frame member 306. Consequently, the intake duct 324 may contact and rub against the frame member 306 as the intake duct 324 moves with the engine 318. Over time, such rubbing contact may create an opening in the intake duct 324 thereby permitting unfiltered air to enter the engine 318, which may damage the engine 318.

Figure 16:
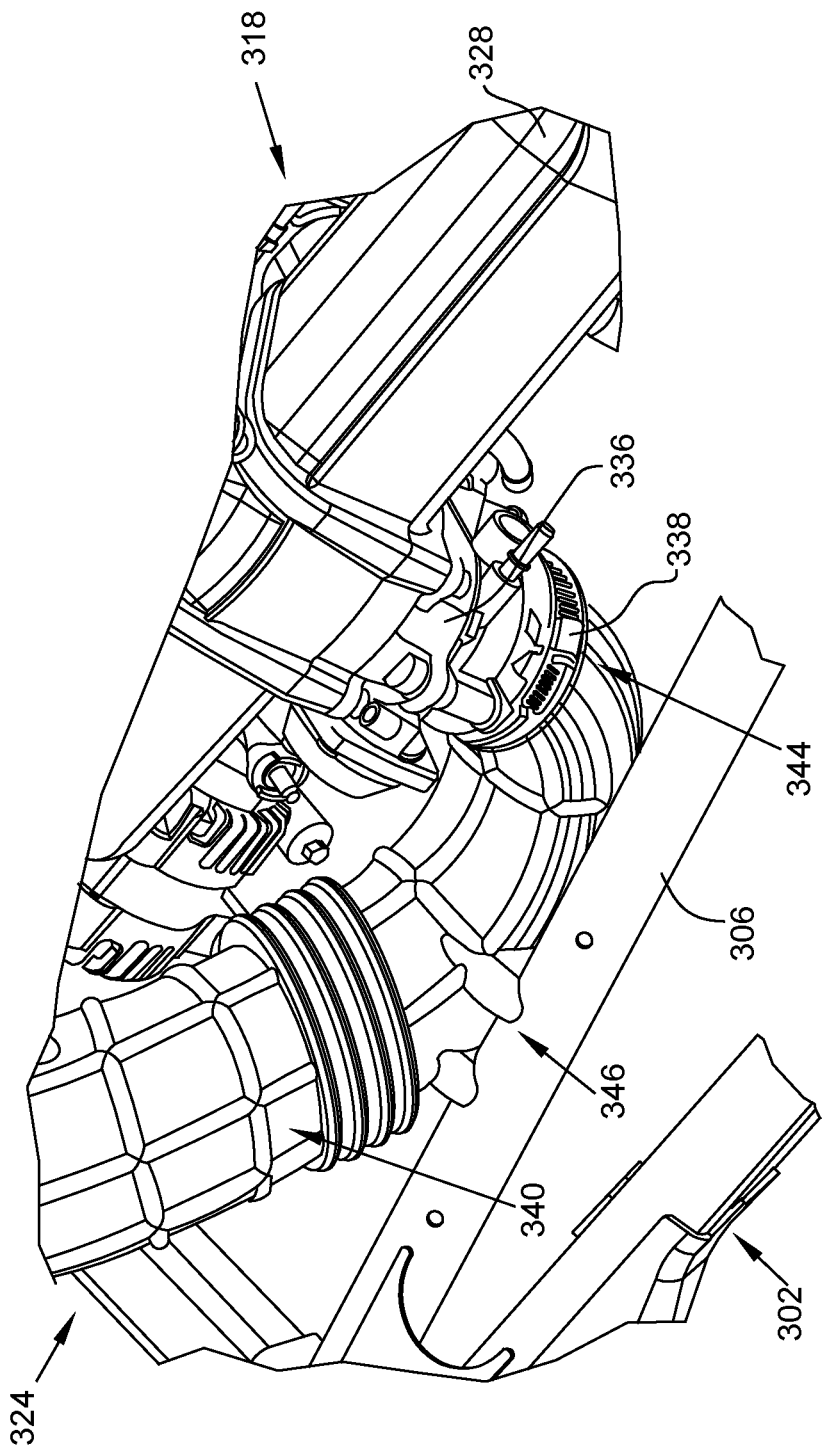
FIGS. 16 and 17 are perspective views of an intake duct according to one embodiment of the present disclosure.

Referring now to FIG. 16, the intake duct 324 according to the present disclosure is shown connected to an inlet 336 of the intake manifold 328 of the engine 318 and secured by a band clamp 338. Intake duct 324 generally includes a flexible body 340 having a first end 342 (FIG. 17) connected to an outlet 343 (FIG. 15) of the airbox 322 and a second end 346 connected to the inlet 336 of the intake manifold 328. As is further described below, an interface 346 is formed onto the flexible body 340 at a position to engage the frame member 306 to accommodate movement of the intake duct 324 relative to the frame member 306 and inhibit damage to the intake duct 324.

Figure 17:
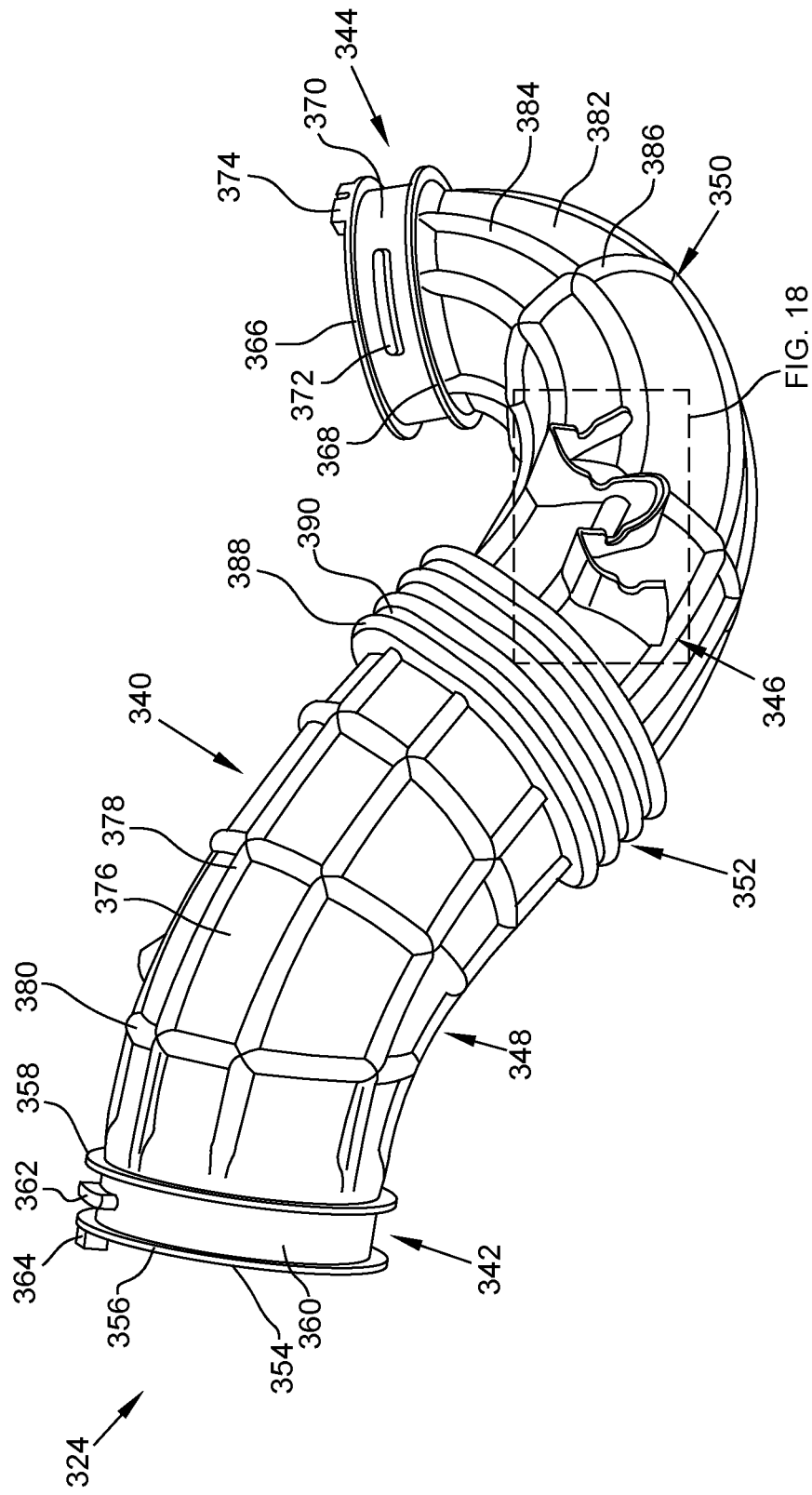

Referring now to FIG. 17, the flexible body 340 of the intake duct 324 includes a first segment 348 extending from the first end 342, a second segment 350 connected to the second end 344, and a ribbed expansion joint 352 connecting the first segment 348 to the second segment 350. As should be understood from the foregoing, the first end 342, the first segment 348, the expansion joint 352, the second segment 350 and the second end 344 of the flexible body 340 define an interior flow passageway 354 for routing filtered air from the airbox 322 to the inlet 336 of the intake manifold 328 of the engine 318.

The first end 342 of the flexible body 340 includes an outer flange 356, an inner flange 358 and a clamping surface 360 between the outer flange 356 and the inner flange 358. The clamping surface 360 is sized to receive a band clamp (not shown) to secure the intake duct 324 to the outlet 343 (FIG. 15) of the airbox 322. An engagement tab 362 extends away from the clamping surface 360 and is configured to engage a positioning opening (not shown) formed in the band clamp to hold one end of the band clamp in a fixed position. Finally, an alignment tab 364 extends outwardly from the outer flange 356 at a position to align with a corresponding notch (not shown) in the outlet 343 (FIG. 15) of the airbox 322 to properly orient the intake duct 324 with the outlet 343.

The second end 342 of the flexible body 340 includes an outer flange 366, an inner flange 368 and a clamping surface 370 between the outer flange 366 and the inner flange 368. The clamping surface 370 is sized to receive a band clamp (i.e., band clamp 338 of FIG. 16) to secure the intake duct 324 to the inlet 336 (FIG. 16) of the intake manifold 328. An engagement tab 372 extends away from the clamping surface 370 and is configured to engage a positioning opening (not shown) formed in the band clamp to hold one end of the band clamp in a fixed position. Finally, an alignment tab 374 extends outwardly from the outer flange 366 at a position to align with a corresponding notch (not shown) in the inlet 336 of the intake manifold 328 to properly orient the intake duct 324 with the inlet 336.

Still referring to FIG. 17, the first segment 348 of the flexible body 340 includes a curved outer wall 376 extending between the inner flange 358 of the first end 342 and the expansion joint 352. The first segment 348 also includes a plurality of longitudinal strengthening ribs 378 projecting from the outer wall 376 and extending between the inner flange 358 and the expansion joint 352. Finally, the first segment 348 includes a plurality of lateral strengthening ribs 380 spaced along the length of the first segment 348 and intersecting with the longitudinal strengthening ribs 378. Similarly, the second segment 350 of the flexible body 340 includes a curved outer wall 382 extending between the inner flange 368 of the second end 344 and the expansion joint 352. The second segment 350 also includes a plurality of longitudinal strengthening ribs 384 projecting from the outer wall 382 and extending between the inner flange 368 and the expansion joint 352. Finally, the second segment 350 includes a plurality of lateral strengthening ribs 386 spaced along the length of the second segment 350 and intersecting with the longitudinal strengthening ribs 384.

The ribbed expansion joint 352 includes a plurality of flexible ribs 388 that extend substantially laterally around the circumference of the intake duct 324 in substantially parallel relationship to one another. Adjacent flexible ribs 388 are connected to one another at a corresponding plurality of connecting segments 390. As should be apparent from the foregoing, the expansion joint 352 permits the first segment 348 of the flexible body 340 and the second segment 350 of the flexible body 340 to flex relative to one another.

As shown in FIG. 17, the interface 346 generally extends laterally outwardly from the outer wall 382 of the second segment 350 of the flexible body 340. In one embodiment of the present disclosure, the intake duct 324 is formed by injection molding. More specifically, a pair of outer forms (not shown) are used to fully enclose an inner form (not shown) with the exception of at least one material injection inlet (not shown). Molten rubber or other suitable material is injected under pressure into the at least one material injection inlet until the void between the outer forms and the inner form is filled. After a drying or curing period when the rubber is solidified, the outer forms are pulled away from the inner form to expose the intake duct 324. Advantageously, the structure of the interface 346 is such that one of the outer molds may be configured to form the interface 346 and be pulled laterally away from the intake duct 324 away from the interface 346, thereby permitting the interface 346 to be injection molded as integral with the flexible body 340.

Figure 18:
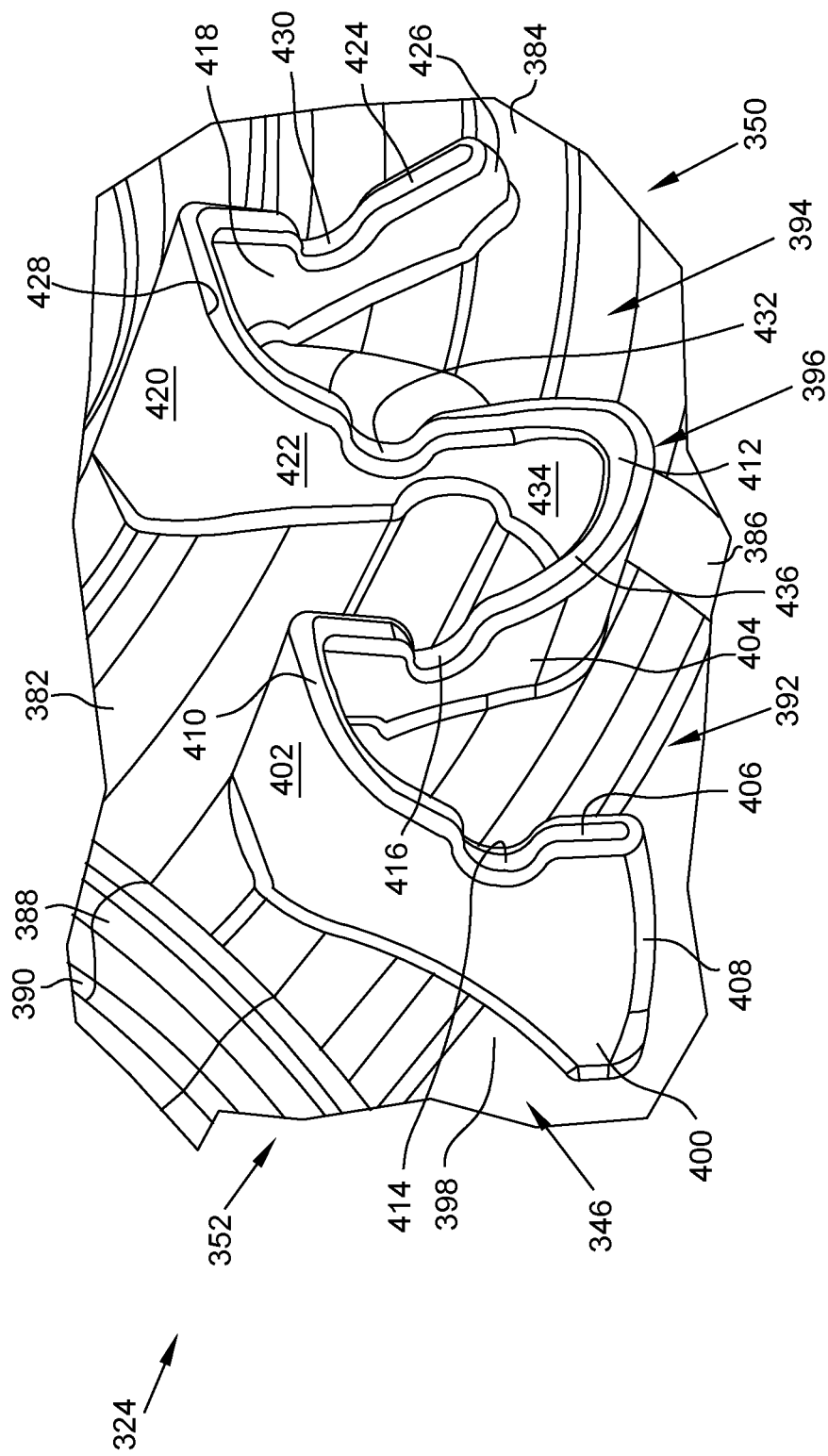
FIG. 18 is a perspective, close up view of an interface of the intake duct of FIGS. 16 and 17.

An enlarged view of the interface 346 is provided in FIG. 18. Interface 346 generally includes a first finger 392 and a second finger 394 which are integrally connected by a connecting segment 396. The interface 346 includes an inner edge 398 that is connected to the outer wall 382 of the second segment 350 of the flexible body 340. The first finger 392 includes an outer side wall 400, an upper wall 402 and an inner side wall 404. The outer side wall 400, the upper wall 402 and the inner side wall 404 share an outer edge 406 as is further described below. The outer side wall 400 extends from a lower end 408 to the upper wall 402, and the inner side wall 404 extends from the upper wall 402 to the connecting segment 396. The outer edge 406 is generally concave between the lower end 408 of the first finger 392 and a central point 410 of the upper wall 402 and between the central point 410 of the upper wall 402 and a central point 412 of the connecting segment 396. A relief cut 414 is formed into the outer edge 406 at the outer side wall 400. A similar relief cut 416 is formed into the outer edge 406 at the inner side wall 404. The relief cuts 414, 416 provide additional flexibility to the first finger 392 as is further described below.

The second finger 394 includes an outer side wall 418, an upper wall 420 and an inner side wall 422. The outer side wall 418, the upper wall 420 and the inner side wall 422 share an outer edge 424 as is further described below. The outer side wall 418 extends from a lower end 426 to the upper wall 420, and the inner side wall 422 extends from the upper wall 420 to the connecting segment 396. The outer edge 424 is generally concave between the lower end 426 of the second finger 394 and a central point 428 of the upper wall 420 and between the central point 428 of the upper wall 420 and the central point 412 of the connecting segment 396. A relief cut 430 is formed into the outer edge 424 at the outer side wall 418. A similar relief cut 432 is formed into the outer edge 424 at the inner side wall 422. The relief cuts 430, 432 provide additional flexibility to the second finger 394 as is further described below. As shown, the connecting segment 396 includes a lower wall 434 extending between the inner wall 404 of the first finger 392 and the inner wall 422 of the second finger 394. The lower wall 434 includes an outer edge 436.

Figure 19:
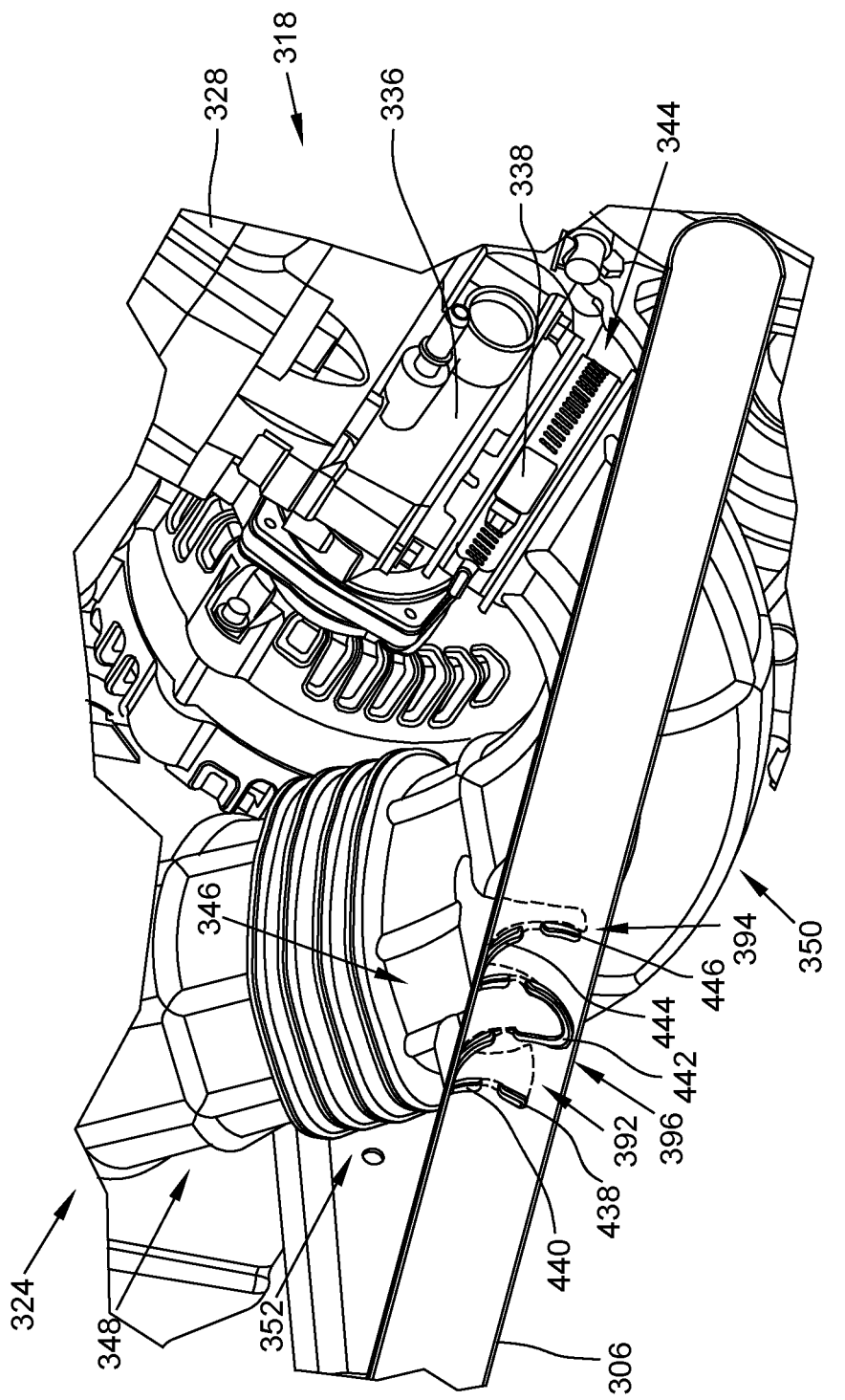
FIG. 19 is a perspective view of the intake duct of FIGS. 16 and 17.

In the embodiment shown, the relief cuts 414, 416, 430 and 432 divide what would otherwise be a continuous outer edge of the interface 346 including the outer edge 406 of the first finger 392, the outer edge 424 of the second finger 394 and the outer edge 436 of the connecting segment 396. In this manner, the interface 346 is configured to engage the frame member 306 at multiple contact locations and remain in substantial engagement with the frame member 306 as the intake duct 324 moves with movements of the engine 318 during vehicle 10 maneuvers. Referring to FIGS. 18 and 19, the outer edge 406 of the first finger 392 includes an outer lower engagement portion 438 below the relief cut 414 and an upper engagement portion 440 between the relief cut 414 and the relief cut 416. The outer edge 406 along the inner side wall 404 below the relief cut 416 of the first finger 392, the outer edge 436 of the connecting portion 396 and the outer edge 424 of the inner side wall 422 below the relief cut 432 of the second finger 394 together define a central lower engagement portion 442. The outer edge 424 of the second finger 394 includes an upper engagement portion 444 between the relief cut 430 and the relief cut 432. Finally, the outer edge 424 of the second finger 394 includes an outer lower engagement portion 446 below the relief cut 430. As a result of the concave shape of the outer edges 406, 424 and 436 described above, the outer lower engagement portion 438, the upper engagement portion 44, the central lower engagement portion 442, the upper engagement portion 444 and the outer lower engagement portion 446 conform substantially to the cylindrical shape of the frame member 306.

Exhaust Sound/Airflow Management Device

In another aspect of the present disclosure relating to the exhaust system 12, a sound and airflow management device is provided to address concerns regarding the noise generated by the exhaust system 12, the direction of the exhaust gasses and the temperature of the exhaust gasses. Typically, the exhaust pipe of an internal combustion engine acts as a point source of noise resulting from the exhaust pulses generated by the engine. A great deal of effort is taken to reduce these sound emissions in the design and calibration of the engine and exhaust system, in part because such emissions are typically regulated by government authorities. All motorcycles, for example, are held to strict noise regulations in most parts of the world. Other vehicles, such as autocycles, are also subject to regulatory noise limits.

Compliance with noise regulations is typically determined by conducting one of two different tests. In one type of test, a microphone is held at a prescribed distance from the exhaust pipe of the vehicle while the vehicle is manipulated in a certain manner such as by revving the engine to a certain RPM condition while the vehicle remains stationary. In another type of test, the vehicle is driven through a "trap" with microphones arrayed on either side of the path of the vehicle symmetrically at a prescribed distance. The vehicle is accelerated from a starting point to an ending point while the microphones measure the sound level emitted by the vehicle to determine compliance.

Figure 20:
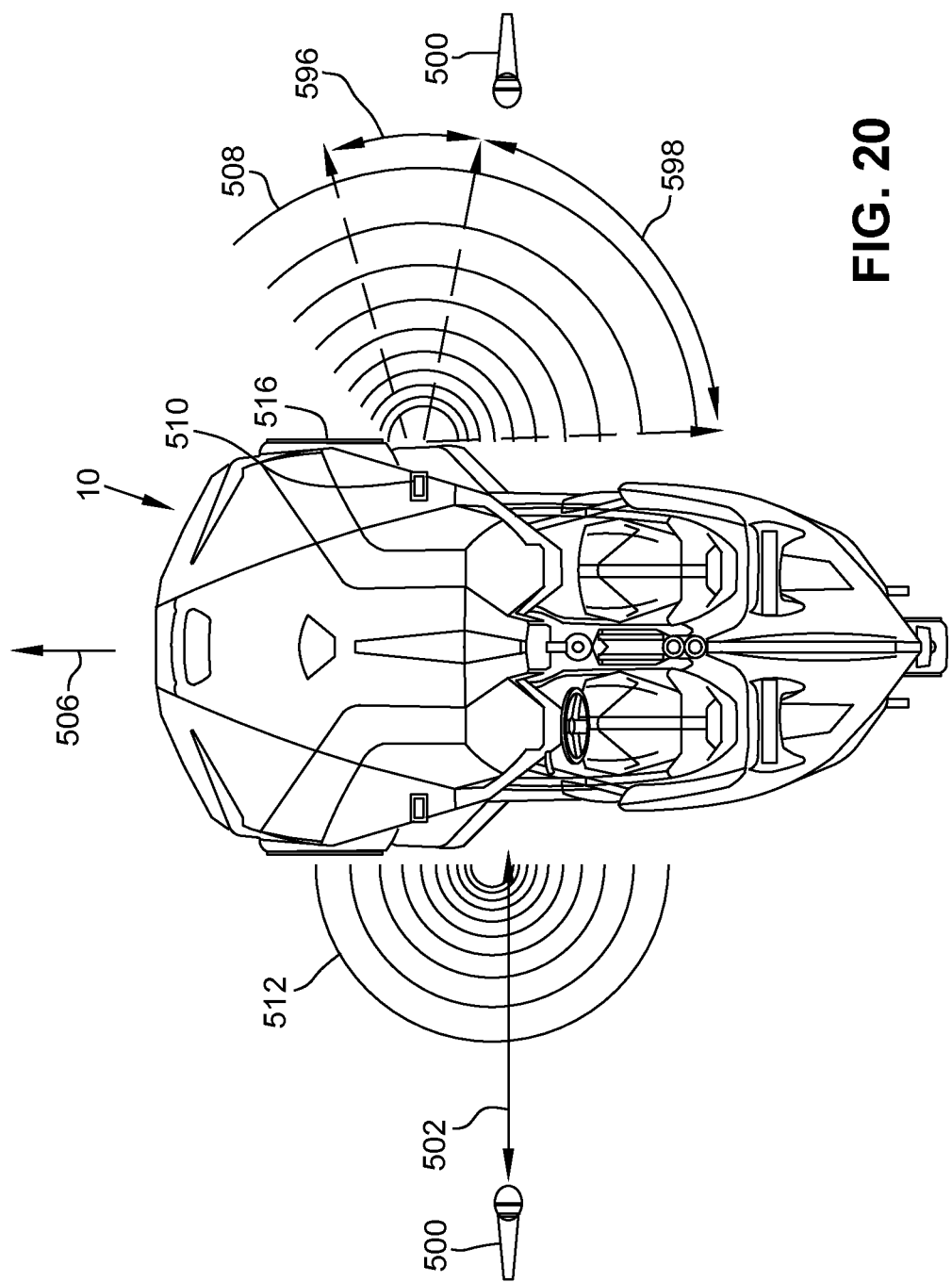
FIG. 20 is a top view of a vehicle depicting noise emanating from the vehicle.
Figure 21:
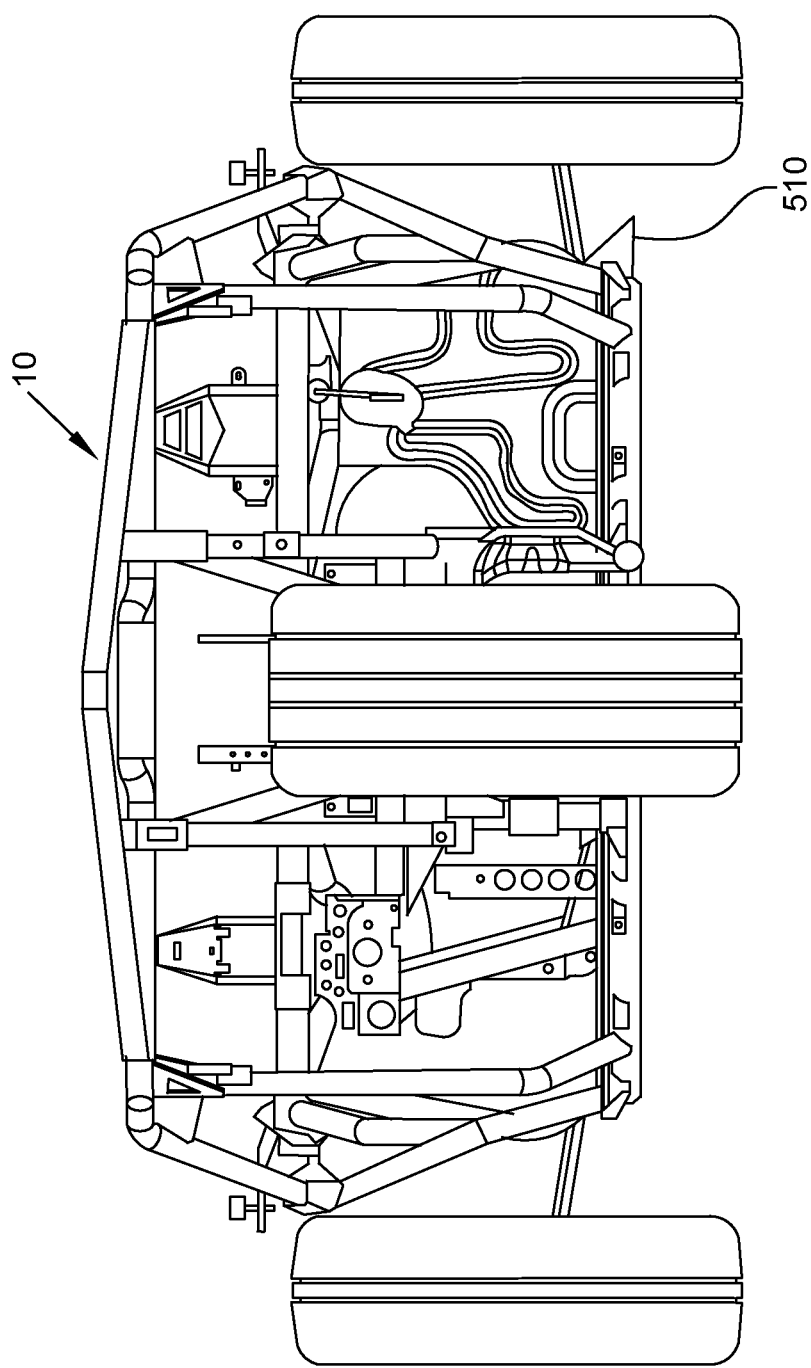
FIG. 21 is a rear view of the vehicle of FIG. 20.

FIG. 20 depicts the second type of test described above. As shown, an array of microphones 500 (only two shown) are positioned a distance 502 from the path of the vehicle 10. The vehicle 10 travels in a direction 506 from a first position to a second position, passing by the microphones 500. In the case of vehicles with a side exit exhaust such as the autocycle 10 depicted in FIGS. 20 and 21 (or motorcycles with a single exhaust pipe on one side), the noise emitted is highly asymmetric (i.e., the noise is much higher on the side of the vehicle with exhaust pipe). This is depicted in FIG. 20 where the sound waves 508 emanating from the exhaust pipe 510 side of the vehicle 10 are louder than the sound waves 512 emanating from the other side of the vehicle 10. This noise asymmetry can cause manufacturers to introduce more noise treatments onto the vehicle, increasing costs, weight, and decreasing performance. Therefore, it is advantageous to make the noise emissions more even from one side to the other, or to provide another means of attenuating exhaust noise.

Figure 22:
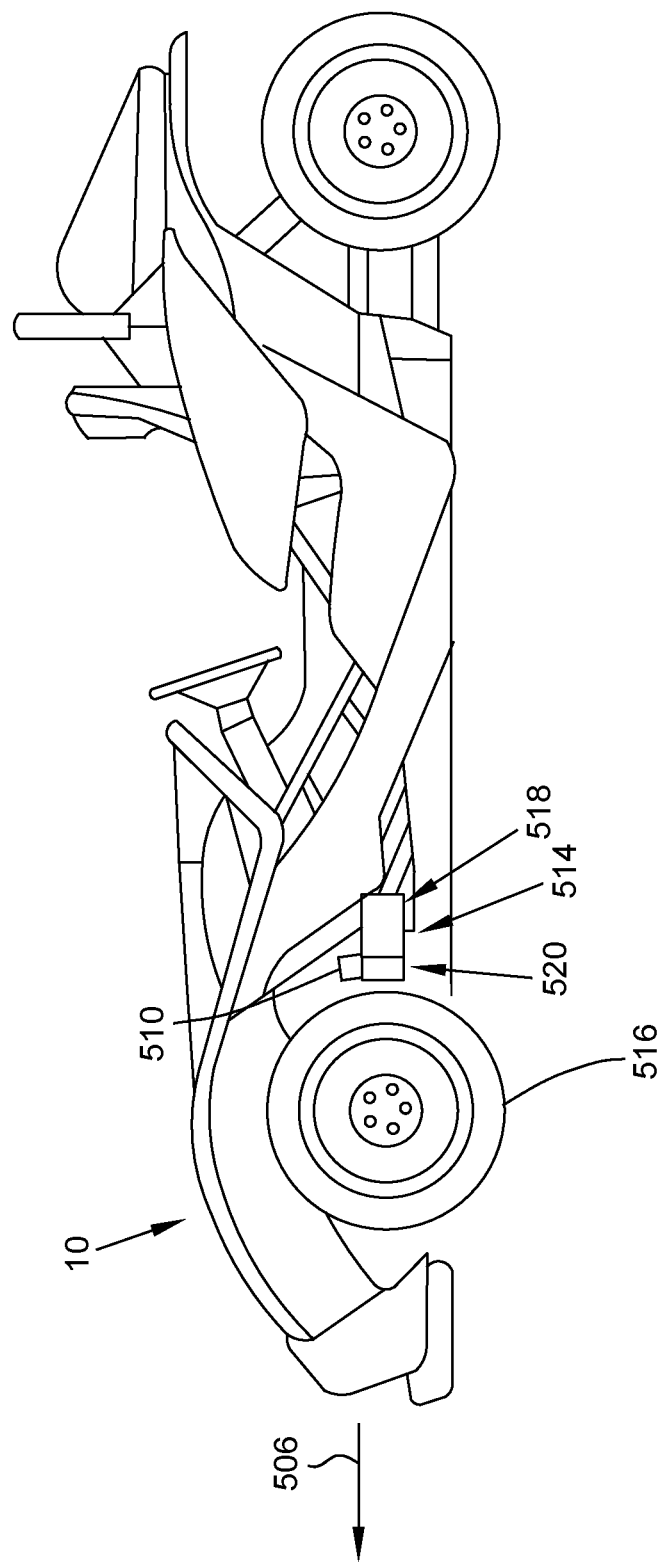
FIG. 22 is a side view of the vehicle of FIG. 20 with an exhaust shield according to one embodiment of the present disclosure.

Referring now to FIG. 22, an exhaust shield 514 according to the teachings of the present disclosure is generally depicted. In the depicted application, the exhaust shield 514 is mounted to a side portion of the body of the vehicle 10 adjacent the exhaust pipe 510. In this embodiment, the exhaust shield 514 is positioned to completely or partially cover the exit of the exhaust pipe 510 when viewed from an angle of +/−45 degrees to the side of the vehicle. As shown, the exhaust pipe 510 is positioned just behind one of the front wheels 516 of the vehicle 10. The exhaust shield 514 generally includes an intake section 518 and a diffuser section 520. As shown, the exhaust shield 514 is mounted such that the intake section 518 is forward of the diffuser section 520 relative to the direction of travel 506 of the vehicle 10.

Figures 23A, 23B:
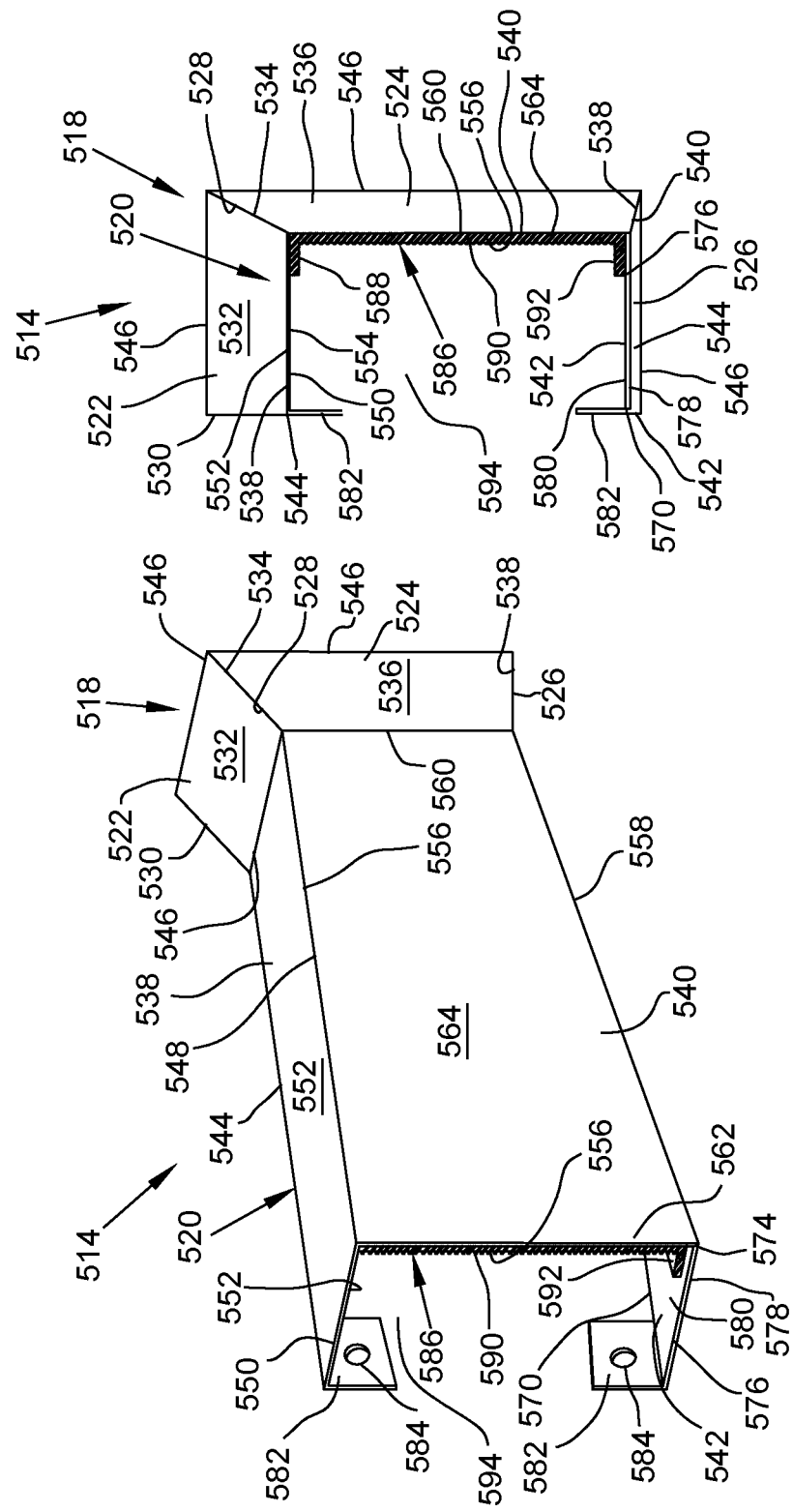
FIG. 23A is a perspective view of the exhaust shield of FIG. 22.
FIG. 23B is an end view of the exhaust shield of FIG. 22.

Referring to FIGS. 23A and 23B, the exhaust shield 514 is shown in more detail. The intake section 518 includes an upper wall 522, a side wall 524 and a lower wall 526. In the depicted embodiment, the upper wall 522 generally extends from and is angled upwardly relative to the diffuser section 520. An outer edge 528 of the upper wall 522 extends upwardly relative to the diffuser section 520 and outwardly relative to the diffuser section 520 and the vehicle 10. The upper wall 522 also includes an inner edge 530, an outer surface 532 and an inner surface (not shown).

The side wall 524 also generally extends from and is angled outwardly relative to the diffuser section 520 and the vehicle 10. The side wall 524 includes an upper edge 534 connected to the outer edge 528 of the upper wall 522. The side wall 524 also includes an outer surface 536, an inner surface (not shown), and a lower edge 538 that extends downwardly relative to the diffuser section 520 and outwardly relative to the diffuser section 520 and the vehicle 10.

The lower wall 526 of the intake section 518 generally extends from and is angled downwardly relative to the diffuser section 520. The lower wall 526 includes an outer edge 540 connected to the lower edge 538 of the side wall 524, an inner edge 542, an outer surface 544 and an inner surface (not shown). The upper wall 522, the side wall 524 and the lower wall 526 share a common forward edge 546. In the depicted configuration, the intake section 518 has a smaller internal area at its connection to the diffuser section 520 than the internal area at the forward edge 546. In this manner, the intake section 518 functions like a hood scoop in that it collects air as the vehicle 10 moves in the direction of travel 506 and directs the collected air into the diffuser section 520.

The diffuser section 520 of the exhaust shield 514 generally includes an upper wall 538, a side wall 540 and a lower wall 542. The upper wall 538 includes an inner edge 544, a forward edge 546, an outer edge 548, a rearward edge 550, an outer surface 552 and an inner surface 554. The side wall 540 includes an upper edge 556, a lower edge 558, a forward edge 560, a rearward edge 562, an outer surface 564 and an inner surface 566. The lower wall 542 includes an inner edge 570, a forward edge 572, an outer edge 574, a rearward edge 576, an outer surface 578 and an inner surface 580. As shown, the upper wall 538 is connected to the upper wall 522 of the intake section 518, the side wall 540 is connected to the side wall 524 of the intake section 518, and the lower wall 542 is connected to the lower wall 526 of the intake section 518.

The diffuser section 520 also includes a plurality of mounting brackets 582 (two shown), each with at least one opening 584 for receiving a fastener (not shown) to mount the exhaust shield 514 to the vehicle 10. A number of the plurality of mounting brackets 582 extend from the inner edge 544 of the upper wall 538 and a number of the plurality of mounting brackets 582 extend from the inner edge 576 of the lower wall 542. The mounting brackets 582 extend in substantially perpendicular relationship to the upper wall 538 and the lower wall 542. Additionally, in certain embodiments the exhaust shield 514 includes an acoustic layer 586 of sound absorbing material fastened or adhered to the diffuser section 520. More specifically, the acoustic layer 586 includes an upper segment 588 attached to the inner surface 554 of the upper wall 538 of the diffuser section 520, a side segment 590 attached to the inner surface 566 of the side wall 540 of the diffuser section 520, and a lower segment 592 attached to the inner surface 580 of the lower wall 542 of the diffuser section 520. Together, the walls of the intake section 518 and the diffuser section 520 and the side of the vehicle 10 form a flow passageway 594 through the exhaust shield 514. In certain embodiments, some or all of the upper wall 538, the side wall 540, and the lower wall 542 are rectangular in shape. In other embodiments, some or all of the upper wall 538, the side wall 540, and the lower wall 542 taper with distance toward or away from the intake section 518.

The exhaust shield 514 functions as a noise shield between the actual exit of the exhaust (which serves as a point source of noise, emitting noise in all directions evenly) and the possible locations of the microphone(s) 500 during the pass-by sound test. Referring back to FIG. 20, the exhaust shield 514 is positioned on the vehicle 10 to reduce the sound waves 508 in a radiating area 596 directed toward the microphone(s) 500. A portion of the sound waves 508 are substantially blocked by the front wheel 516. The radiating area 598 rearward of the exhaust shield 514 is not of concern as the vehicle 10 will have passed the testing area by the time the waves in the radiating area 598 reach the microphone(s) 500. Thus, by reducing the sound emissions traveling directly towards the microphone(s) 500, sound levels are attenuated during the test. This reduces the burden of noise attenuation in the exhaust, saving cost and weight, and/or allowing greater power generation, or some favorable combination of these parameters. Furthermore, the exhaust shield 514 is arranged on the outside of the body of the vehicle 10, where it can receive and direct airflow as the vehicle moves in the direction of travel 506. In this manner, the exhaust shield 514 produces a venturi effect § which increases airflow velocity and reduces dynamic pressure. This can be used to alter and dilute the flow of the exhaust gases from the engine. For open vehicles such as the autocycle vehicle 10 depicted in the figures, special care must be taken to ensure that exhaust gases are not allowed to recirculate around the vehicle in a way that may cause the occupants to breathe the gases. The exhaust shield 514 offers another tool that can be used to direct this flow, dilute the gases, and reduce recirculation. Furthermore, the exhaust shield 514 will experience cooling from both inside and outside surfaces of the intake section 518 and the diffuser section 520 and will dilute and therefore reduce the temperature of the exhaust gases as they leave the vehicle 10. This can be used to reduce the temperature inside the cabin and reduce the risk of pedestrians contacting hot exhaust gases or exhaust components. In addition to this, the exhaust shield 514 may be styled in an exciting and novel way, providing the potential for different treatments/finishes for potential accessory sales.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A catalytic converter, comprising:
    a mantle tube defining a flow passageway from an inlet end to an outlet end;
    an inlet matrix brick positioned within the flow passageway and including a matrix body having an inlet end adjacent the inlet end of the mantle tube and an outlet end, the matrix body formed from a first foil having a first thickness; and
    an outlet matrix brick positioned within the flow passageway and including a matrix body having an inlet end adjacent and spaced apart from the outlet end of the matrix body of the inlet matrix brick and an outlet end adjacent the outlet end of the mantle tube, the matrix body of the outlet matrix brick formed from a second foil having a second thickness;
    wherein the first thickness is greater than the second thickness.

2. The catalytic converter of claim 1, wherein the mantle tube includes a cylindrical wall that defines the flow passageway.

3. The catalytic converter of claim 1, wherein the matrix body of the inlet matrix brick is configured as a helical coil of the first foil that substantially fills the flow passageway, and the matrix body of the outlet matrix brick is configured as a helical coil of the second foil that substantially fills the flow passageway.

4. The catalytic converter of claim 3, wherein the first foil includes a first plurality of cells and the second foil includes a second plurality of cells such that the helical coil of the matrix body of the inlet matrix brick includes a first number of cells per square inch and the helical coil of the matrix body of the outlet matrix brick includes a second number of cells per square inch, the second number of cells per square inch being greater than the first number of cells per square inch.

5. The catalytic converter of claim 4, wherein the first number of cells per square inch is 300 and the second number of cells per square inch is 600.

6. The catalytic converter of claim 1, wherein the first thickness of the first foil is approximately 80 μm and the second thickness of the second foil is 50 um.

7. The catalytic converter of claim 1, wherein the mantle tube comprises a plurality of retaining surfaces retaining the inlet matrix brick and the outlet matrix brick.

8. The catalytic converter of claim 1, wherein the inlet matrix brick comprises a corrugated foil.

9. The catalytic converter of claim 1, wherein the outlet matrix brick comprises a corrugated foil.

10. A method of using a catalytic converter, the catalytic converter comprising a mantle tube defining a flow passageway from an inlet end to an outlet end; an inlet matrix brick positioned within the flow passageway and including a matrix body having an inlet end adjacent the inlet end of the mantle tube and an outlet end, the matrix body formed from a first foil having a first thickness; and an outlet matrix brick positioned within the flow passageway and including a matrix body having an inlet end adjacent and spaced apart from the outlet end of the matrix body of the inlet matrix brick and an outlet end adjacent the outlet end of the mantle tube, the matrix body of the outlet matrix brick formed from a second foil having a second thickness, wherein the first thickness is greater than the second thickness, the method comprising:
    directing exhaust gasses to the inlet matrix brick, thereby introducing turbulence to exhaust gasses entering the outlet matrix brick.

11. The method of claim 10, wherein the mantle tube includes a cylindrical wall that defines the flow passageway.

12. The method of claim 10, wherein the matrix body of the inlet matrix brick is configured as a helical coil of the first foil that substantially fills the flow passageway, and the matrix body of the outlet matrix brick is configured as a helical coil of the second foil that substantially fills the flow passageway.

13. The method of claim 12, wherein the first foil includes a first plurality of cells and the second foil includes a second plurality of cells such that the helical coil of the matrix body of the inlet matrix brick includes a first number of cells per square inch and the helical coil of the matrix body of the outlet matrix brick includes a second number of cells per square inch, the second number of cells per square inch being greater than the first number of cells per square inch.

14. The method of claim 13, wherein the first number of cells per square inch is 300 and the second number of cells per square inch is 600.

15. The method of claim 10, wherein the first thickness of the first foil is 80 μm and the second thickness of the second foil is 50 um.

* * * * *